US010990861B2

(12) United States Patent
Sugiyama et al.

(10) Patent No.: US 10,990,861 B2
(45) Date of Patent: Apr. 27, 2021

(54) PRINTER COMMUNICATION USING FORMATTED PRINTING INFORMATION AND ALTERATION OR DELETION OF FORMATTED PRINTING INFORMATION

(71) Applicant: SEIKO EPSON CORPORATION, Tokyo (JP)

(72) Inventors: Yuichi Sugiyama, Matsumoto (JP); Hidehisa Omiya, Matsumoto (JP); Shigeru Hirai, Aoki-mura (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 16/686,656

(22) Filed: Nov. 18, 2019

(65) Prior Publication Data

US 2020/0160127 A1 May 21, 2020

(30) Foreign Application Priority Data

Nov. 19, 2018 (JP) .............................. JP2018-216252

(51) Int. Cl.
*G06K 15/02* (2006.01)
*G06F 3/12* (2006.01)
*H04N 1/44* (2006.01)

(52) U.S. Cl.
CPC ....... *G06K 15/1831* (2013.01); *G06K 15/022* (2013.01); *G06K 15/028* (2013.01); *G06F 3/1245* (2013.01); *H04N 1/4446* (2013.01)

(58) Field of Classification Search
None
See application file for complete search history.

(56) References Cited

U.S. PATENT DOCUMENTS

| | | | |
|---|---|---|---|
| 2008/0137126 A1* | 6/2008 | Yoshida | G06F 3/1204 358/1.14 |
| 2011/0184822 A1 | 7/2011 | Matkovic | |
| 2014/0122276 A1* | 5/2014 | Argue | G06Q 20/20 705/24 |
| 2016/0104143 A1* | 4/2016 | Sugiyama | G06Q 20/209 358/1.6 |

FOREIGN PATENT DOCUMENTS

JP 2015-130092 7/2015

* cited by examiner

*Primary Examiner* — Haris Sabah
(74) *Attorney, Agent, or Firm* — Workman Nydegger

(57) ABSTRACT

There is provided a printer including: a storage that stores transmission discrimination format information and information specification format information; a printing executor that performs printing based on print data received from a POS terminal; and a controller that transmits print text data, in which information adapted to information specification format indicated by information specification format information among information included in the print text data is converted or deleted, to a control server when a format of the print text data based on the print data received from the POS terminal is adapted to a transmission discrimination format indicated by the transmission discrimination format information.

14 Claims, 12 Drawing Sheets

FIG. 6

ITD

```
1234XXXXStreet,New York
12-345-678
Server: ABCD            Station: 2
-------------------------------
1    Beer                  10.00
2    Toy                   30.00
-------------------------------
Subtotal                   70.00
Tax                         6.13
                         =======
TOTAL                      76.13
OPQ Tenderd                76.13
Card No    XXXX-XXXX-XXXX-1234
                         =======
Check#: 00002
12/12/2015 12:15:46
THANK YOU!
```

FIG. 10

ITD

```
1234XXXXStreet,New York
12-345-678
Server: XXXX              Station: 2
------------------------------------
1    Beer                      10.00
2    Toy                       30.00
------------------------------------
Subtotal                       70.00
Tax                             6.13
                              = = = = =
TOTAL                          76.13
OPQ Tenderd                    76.13
Card No   XXXX-XXXX-XXXX-XXXX
                              = = = = =
Check#: 00002
12/12/2015 12:15:46
THANK YOU!
```

FIG. 11

ITD

| | |
|---|---|
| 1234XXXXStreet,New York | |
| 12-345-678 | |
| Server: | Station: 2 |

1 Beer 10.00

2 Toy 30.00

Subtotal 70.00

Tax 6.13

=====

TOTAL 76.13

OPQ Tenderd 76.13

Card No

=====

Check#: 00002

12/12/2015 12:15:46

THANK YOU!

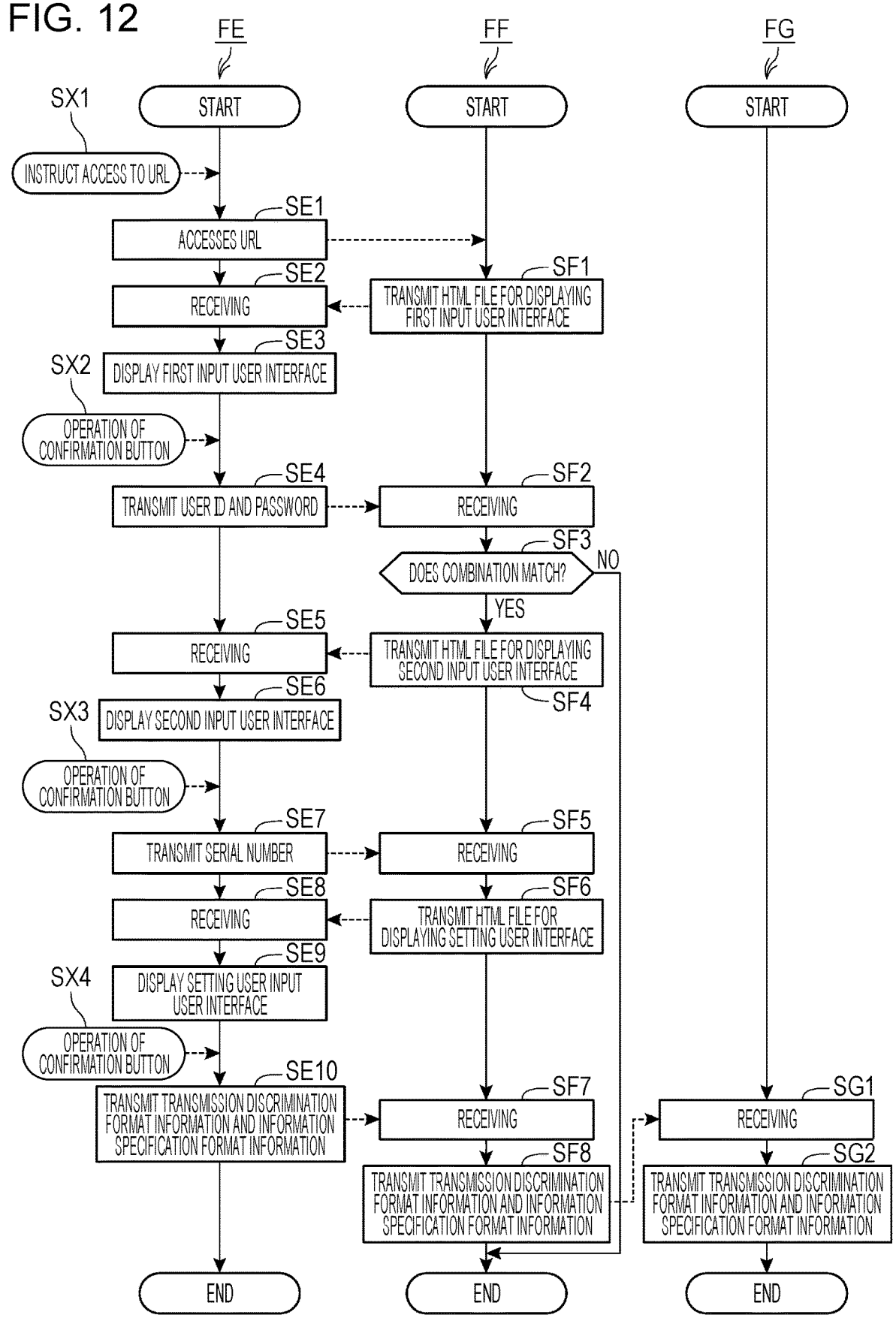

PRINTER COMMUNICATION USING FORMATTED PRINTING INFORMATION AND ALTERATION OR DELETION OF FORMATTED PRINTING INFORMATION

The present application is based on, and claims priority from JP Application Serial Number 2018-216252, filed Nov. 19, 2018, the disclosure of which is hereby incorporated by reference herein in its entirety.

BACKGROUND

1. Technical Field

The present disclosure relates to a printer and a control method thereof.

2. Related Art

In the related art, there is known a printer that transmits printing information received from a terminal to an information processor (for example, see JP-A-2015-130092). A printer described in JP-A-2015-130092 receives printing control data, which is printing information, from a POS terminal, performs printing based on the received printing control data, and when printing is normally completed, the printing control data received from the POS terminal is transmitted to a control server which is an information processor.

The printer described in JP-A-2015-130092 may also transmit unnecessary information in the transmission of printing information to the information processor.

SUMMARY

According to an aspect of the present disclosure, there is provided a printer configured to communicate with a terminal and an information processor, including: a storage that stores first format information indicating a first format and second format information indicating a second format; a printing executor that performs printing based on printing information received from the terminal; and a controller that discriminates whether or not a format of the printing information received from the terminal is adapted to the first format indicated by the first format information stored in the storage, and when it is discriminated that the format of the printing information is adapted to the first format, transmits, to the information processor, the printing information in which information adapted to the second format indicated by the second format information stored in the storage among information included in the printing information is converted or deleted.

In the printer, the first format may be a format of the printing information relating to a printing of a specific type of a printed matter among types of printed matters that is able to be printed by the printing executor.

In the printer, the first format may be a format of the printing information relating to a printing of the printed matter on which settlement information about a settlement is printed.

In the printer, the second format may be a format relating to a character string corresponding to personal information among information included in the printing information.

In the printer, the second format may be a format relating to a layout of printing of personal information among information included in the printing information.

In the printer, the controller may analyze text data corresponding to the printing information, and based on an analysis result, discriminate whether or not a format of the text data is adapted to the first format and the second format.

In the printer, the controller may acquire the first format information and the second format information from the information processor, and store the acquired first format information and the second format information in the storage.

According to another aspect of the present disclosure, there is provided a control method of a printer configured to communicate with a terminal and an information processor, including: storing first format information indicating a first format and second format information indicating a second format; discriminating whether or not a format of printing information received from the terminal is adapted to the first format indicated by the stored first format information; and when it is discriminated that the format of the printing information is adapted to the first format, transmitting the printing information in which information adapted to the second format indicated by the stored second format information among information included in the printing information is converted or deleted to the information processor.

BRIEF DESCRIPTION OF THE DRAWINGS

FIG. 6 is a diagram showing an example of print text data.

FIG. 10 is a diagram showing an example of print text data.

FIG. 11 is a diagram showing an example of print text data.

FIG. 12 is a flowchart showing operations of a manager, the control server, and the printer.

DESCRIPTION OF EXEMPLARY EMBODIMENTS

Figure 1:
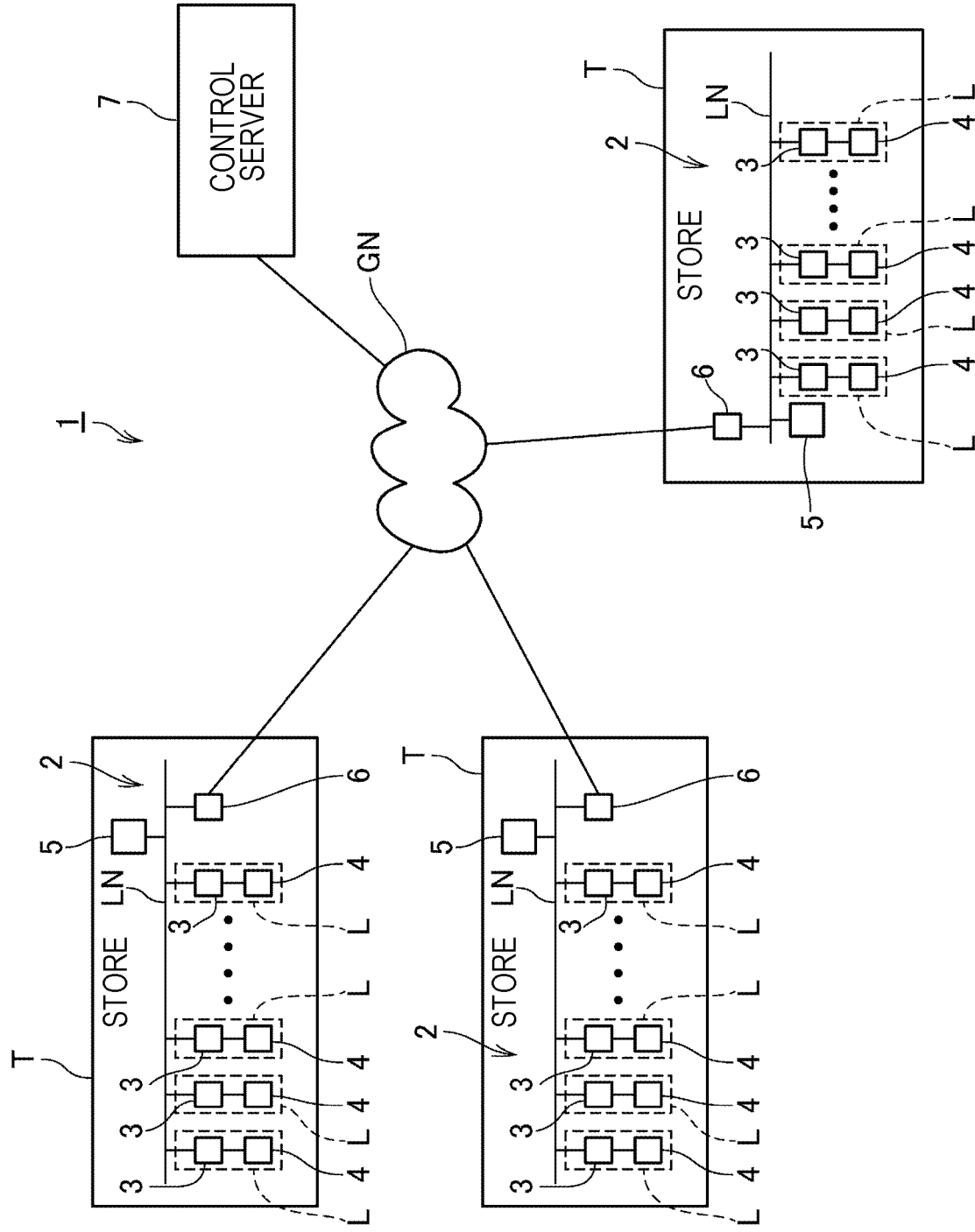
FIG. 1 is a diagram showing a configuration of an information processing system.

FIG. 1 is a diagram showing a configuration of an information processing system 1 according to an embodiment.

As shown in FIG. 1, the information processing system 1 includes a plurality of store systems 2. The store system 2 is a system used for stores T such as supermarkets, convenience stores, department stores, and restaurants. The store T may be a facility where commodities are offered and customer accounting takes place as commodities are offered. In the present embodiment, "commodity" means an object to be offered to a customer in return for payment, such as a service provided to the customer and food served to the customer, as well as a commodity delivered to the customer as an object.

The store system 2 is provided with a function of performing accounting based on commodities purchased by customers, a function of issuing receipts R based on the accounting, and the like. The receipt R corresponds to a printed matter issued by a printer 3.

In the store T to which the store system 2 is applied, a checkout counter L for performing accounting by a customer is provided. The checkout counter L corresponds to an accounting counter for performing accounting. FIG. 1 shows a case where a plurality of checkout counters L are provided in one store, but one checkout counter L may be provided in the one store T. The checkout counter L is provided with the printer 3 having a function of printing on roll paper, which is one aspect of a printing medium. The checkout counter L is provided with a POS terminal 4 that is connected to the printer 3 in a wirelessly communicable manner and controls the printer 3. The POS terminal corresponds to a terminal. Details of the printer 3 and the POS terminal 4 will be described later.

At the time of accounting at the checkout counter L, a cashier in charge of accounting at the checkout counter L reads a barcode attached to a commodity or a package of the commodity with a barcode reader BR connected to the printer 3, and also performs input corresponding to the accounting to the POS terminal 4. The printer 3 transmits data based on reading by the barcode reader BR to the POS terminal 4. The POS terminal 4 generates accounting information on the basis of data based on the reading of the barcode reader BR received from the printer 3 and an input corresponding to the accounting by the cashier, and further, generates print data ID or a command based on the accounting information, transmits the print data ID to the printer 3, and controls the printer 3 to issue a receipt R. The receipt R issued by the printer 3 is passed to the customer by the cashier.

The store system 2 includes a local area network LN.

The printer 3 and the management apparatus 5 are connected to the local area network LN. The management apparatus 5 corresponds to a controller. Details of the management apparatus 5 will be described later.

A communicator 6 is connected to the local area network LN. The communicator 6 is an interface for connecting a local area network LN and a global network GN including the Internet, a telephone network, and other communication networks. The communicator 6 has a function relating to a modem or an optical network unit (ONU), a router function, a network address translation (NAT) function, a dynamic host configuration protocol (DHCP) server function, or the like. At the time of communication between an apparatus connected to the local area network LN and an apparatus connected to the global network GN, data to be transmitted and received between apparatuses is transmitted by the communicator 6. Note that although the communicator 6 is represented by one block in FIG. 1, the communicator 6 may be configured to have a plurality of devices depending on functions.

The printer 3 and the management apparatus 5 can access the global network GN via the communicator 6.

The control server 7 is connected to the global network GN. The control server 7 corresponds to an information processor. The control server 7 is a server capable of communicating with the printer 3 and the management apparatus 5. That is, the control server 7 executes predetermined arithmetic processing in response to a request from a client as a trigger. The control server 7 transmits data based on a result of the arithmetic processing to the client as necessary. In FIG. 1, although the control server 7 is represented by one block, this does not mean that the control server 7 is configured by a single server. For example, the control server 7 may be configured to include a plurality of servers. That is, the control server 7 may have any form as long as it can execute various processing to be described later.

Figure 2:
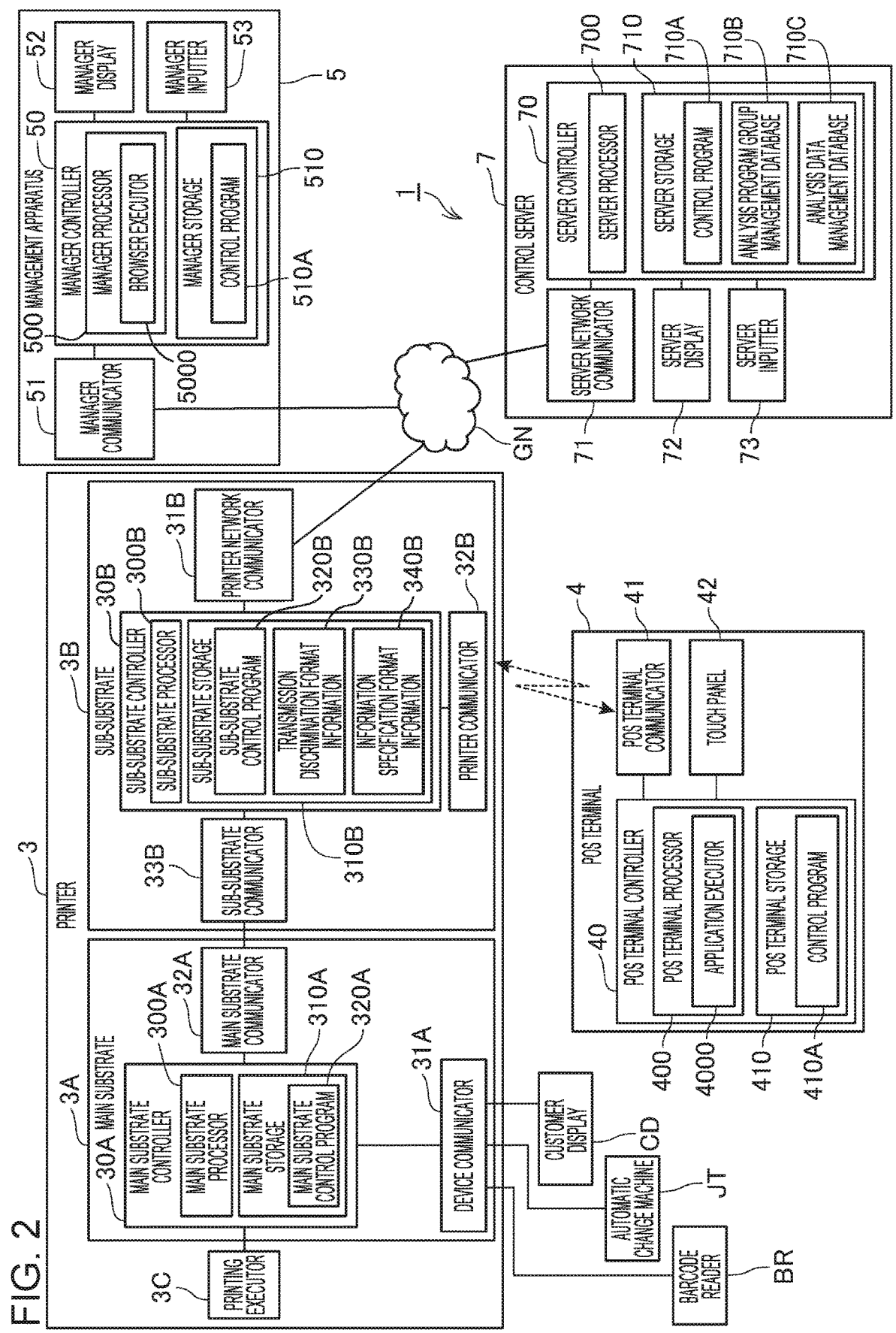
FIG. 2 is a block diagram showing a functional configuration of each device provided in the information processing system.

FIG. 2 is a block diagram showing a functional configuration of each device provided in the information processing system 1.

The POS terminal 4 is, for example, a tablet-type terminal in which a touch panel 42 is provided in a wide area on a front surface. The POS terminal 4 may be a desktop-type stationary terminal. The POS terminal 4 functions as a host computer that controls the printer 3 by executing various processing relating to accounting at the time of accounting at the checkout counter L.

As shown in FIG. 2, the POS terminal 4 includes a POS terminal controller 40, a POS terminal communicator 41, and a touch panel 42.

The POS terminal controller 40 includes a POS terminal processor 400 that is a processor which executes programs of a CPU, an MPU or the like, and a POS terminal storage 410, and controls each part of the POS terminal 4. The POS terminal controller 40 executes various processing in cooperation with hardware and software so that the POS terminal processor 400 reads a control program 410A stored in the POS terminal storage 410 and executes the processing. A predetermined application is installed in advance on the POS terminal 4. The POS terminal controller 40 functions as an application executor 4000 by the POS terminal processor 400 reading and executing the predetermined application, a program attached to the predetermined application, and other programs from the POS terminal storage 410. The application executor 4000 will be described later.

The POS terminal storage 410 has a storage area for storing a program executed by the POS terminal processor 400 and data processed by the POS terminal processor 400. The POS terminal storage 410 stores a control program 410A executed by the POS terminal processor 400 and various other data. The POS terminal storage 410 has a non-volatile storage area for storing a program or data in a non-volatile manner. Further, the POS terminal storage 410 may be provided with a volatile storage area, and may be configured with a work area for temporarily storing a program executed by the POS terminal processor 400 and data to be processed.

The POS terminal communicator 41 is configured with communication hardware based on a predetermined communication standard, and communicates with the printer 3 under the control of the POS terminal controller 40. Examples of communication hardware include hardware such as a communication circuit, a communication port, a communication substrate, and a communication connector. The POS terminal communicator 41 of the present embodiment communicates with the printer 3 based on a predetermined wireless communication standard. The communication standard of the wireless communication performed between the POS terminal 4 and the printer 3 may be any standard such as a standard relating to a wireless LAN corresponding to an ad hoc mode, a standard relating to a wireless LAN corresponding to an infrastructure mode, or a standard relating to a short distance wireless communication such as Bluetooth. Bluetooth is a registered trademark. The POS terminal communicator 41 may be configured to communicate with the printer 3 based on a predetermined wired communication standard.

The touch panel 42 includes a display panel such as a liquid crystal display panel, and a touch sensor provided on the display panel in an overlapping manner or in an integrated manner. The display panel displays various images under the control of the POS terminal controller 40. The touch sensor detects a touch operation and outputs the touch operation to the POS terminal controller 40. The POS terminal controller 40 executes processing corresponding to the touch operation based on the input from the touch sensor.

The printer 3 is a thermal printer that accommodates roll paper, forms a dot on the accommodated roll paper with a line-type thermal head, and prints characters, images, or the like. Although a printing method of the printer 3 according to the present embodiment is a thermal method, the printing method of the printer 3 is not limited to the thermal method, and may be another printing method such as an ink jet method. Further, the print head of the printer 3 is not limited to the line-type and may be a serial-type.

As shown in FIG. 2, the printer 3 includes a main substrate 3A and a sub-substrate 3B.

The main substrate 3A is a main substrate that controls the entire printer 3, and has a main substrate controller 30A, a device communicator 31A, and a main substrate communicator 32A.

The main substrate controller 30A includes a main substrate processor 300A, which is a processor that executes programs of a CPU, an MPU, or the like, and a main substrate storage 310A, and controls each part of the printer 3. The main substrate controller 30A executes various processing in cooperation with hardware and software so that the main substrate processor 300A reads a main substrate control program 320A stored in the main substrate storage 310A and executes the processing.

The main substrate storage 310A has a storage area for storing a program executed by the main substrate processor 300A and data processed by the main substrate processor 300A. The main substrate storage 310A stores the main substrate control program 320A executed by the main substrate processor 300A and various other data. The main substrate storage 310A has a non-volatile storage area for storing a program or data in a non-volatile manner. The main substrate storage 310A may be provided with a volatile storage area, and may be configured with a work area for temporarily storing a program executed by the main substrate processor 300A or data to be processed.

A device communicator 31A includes an interface board having a port based on an universal serial bus (USB) standard, a port based on a serial communication standard other than the USB, a port based on a parallel communication standard, a port based on a communication standard relating to a wired LAN, and other ports. A device can be connected to each port. The device communicator 31A communicates with a device connected to the printer 3 through a port under the control of the main substrate controller 30A. The device communicator 31A may have a wireless communication function and perform wireless communication with the device.

A barcode reader BR, a customer display CD, and an automatic change machine JT are connected to the printer 3 as devices.

The barcode reader BR reads a barcode attached to a commodity, a package of the commodity, or the like, and outputs data indicating the read-out result to the device communicator 31A. The device communicator 31A outputs the data input from the barcode reader BR to the main substrate controller 30A.

The customer display CD displays information about accounting under the control of the main substrate controller 30A. The information displayed on the customer display CD can be viewed by a customer who performs accounting at the checkout counter L.

The automatic change machine JT has a money receiving port for inserting money received from a customer, and a change discharge port for discharging money relating to change, and discharges the corresponding change from the change discharge port when money is input through the money receiving port under the control of the main substrate controller 30A.

The main substrate communicator 32A is configured with communication hardware based on a predetermined communication standard, and communicates with the sub-substrate 3B based on the predetermined communication standard under the control of the main substrate controller 30A. Examples of communication hardware include hardware such as a communication circuit, a communication port, and a communication connector.

The sub-substrate 3B is a substrate for performing addition of a function to the printer 3, enhancement of a function of the printer 3, and the like, and is detachably attached to the printer 3. The sub-substrate 3B is connected to the main substrate 3A when it is being attached to the printer 3. The sub-substrate 3B includes a sub-substrate controller 30B, a printer network communicator 31B, a printer communicator 32B, and a sub-substrate communicator 33B. The sub-substrate controller 30B corresponds to a controller.

The sub-substrate controller 30B includes a sub-substrate processor 300B that is a processor that executes programs of a CPU, an MPU, or the like, and a sub-substrate storage 310B, and controls each part of the sub-substrate 3B. The sub-substrate storage 310B corresponds to a storage. The sub-substrate controller 30B executes various processing in cooperation with hardware and software so that the sub-substrate processor 300B reads a sub-substrate control program 320B stored in the sub-substrate storage 310B and executes the processing.

The sub-substrate storage 310B has a storage area for storing a program executed by the sub-substrate processor 300B and data processed by the sub-substrate processor 300B. The sub-substrate storage 310B stores the sub-substrate control program 320B executed by the sub-substrate processor 300B, transmission discrimination format information 330B, information specification format information 340B, and various other data. The transmission discrimination format information 330B corresponds to first format information. The information specification format information 340B corresponds to second format information. These format information will be described later. The sub-substrate storage 310B has a non-volatile storage area for storing a program or data in a non-volatile manner. Further, the sub-substrate storage 310B may include a volatile storage area, and may be configured with a work area for temporarily storing a program executed by the sub-substrate processor 300B and data to be processed.

The printer network communicator 31B includes communication hardware based on a predetermined wireless communication standard, and communicates with an apparatus connected to the global network GN based on a predetermined communication standard under the control of the sub-substrate controller 30B. The apparatus connected to the global network GN includes the management apparatus 5 and the control server 7. Examples of communication standards used by the printer network communicator 31B for communication include HTTP or WebSocket.

The printer communicator 32B is configured with communication hardware based on a predetermined communication standard, and communicates with the POS terminal 4 under the control of the sub-substrate controller 30B. The printer communicator 32B of the present embodiment communicates with the POS terminal 4 based on a predetermined wireless communication standard. The printer communicator 32B may be configured to communicate with the POS terminal 4 based on a predetermined wired communication standard.

The sub-substrate communicator 33B is configured with communication hardware based on a predetermined communication standard, and communicates with the main substrate 3A based on the predetermined communication standard under the control of the sub-substrate controller 30B.

As shown in FIG. 2, the printer 3 includes a printing executor 3C.

The printing executor 3C includes various mechanisms relating to printing on roll paper, such as a transport mechanism for transporting a roll paper accommodated in a housing of the printer 3, a printing mechanism that forms dots on the roll paper by using the thermal head and prints an image, and a cutting mechanism that cuts the roll paper at a predetermined position. The printing executor 3C transports the roll paper by the transport mechanism under the control of the main substrate controller 30A, prints an image relating to a printed matter issued on the roll paper by the printing mechanism, cuts the roll paper at a predetermined position by the cutting mechanism, and issues the printed matter. In accordance with print data ID received from the POS terminal 4, the printer 3 in the present embodiment can issue three types of printed matter, a receipt R on which settlement information about the settlement made in accounting is printed, an attendance sheet, and a report. The attendance sheet is a printed matter on which information about the attendance of workers working at the store T is printed. The report is a printed matter on which information indicating sales of the store T for a predetermined period is printed.

The management apparatus 5 is a device managed by a main agent that operates the store T to which the store system 2 is applied. The management apparatus 5 may be a desktop-type device, a tablet-type device, or a laptop-type device. The management apparatus 5 is operated by a person having authority in operations such as an employee of the store T or an employee of a company that operates the store T. In the present embodiment, as shown in FIG. 1, a case where one management apparatus 5 is provided in one store T is exemplified. The management apparatus 5 communicates with the control server 7, receives the provision of a predetermined service from the control server 7, and performs an operation corresponding to the service. For example, the management apparatus 5 receives the provision of a predetermined service from the control server 7, and manages a commodity purchase status of a certain store T, a sales status of a certain store T, an employee working status of a certain store T, and the like.

The management apparatus 5 includes a manager controller 50, a manager communicator 51, a manager display 52, and a manager inputter 53.

The manager controller 50 includes a manager processor 500 that is a processor which executes programs of a CPU, an MPU, or the like, and a manager storage 510, and controls each part of the management apparatus 5. The manager controller 50 executes various processing in cooperation with hardware and software so that the manager processor 500 reads a control program 510A stored in the manager storage 510 and executes the processing. A browser is installed in advance on the management apparatus 5. The manager controller 50 functions as a browser executor 5000 by the manager processor 500 reading and executing a browser and other accompanying programs from the manager storage 510. The browser executor 5000 will be described later.

The manager storage 510 has a storage area for storing a program executed by the manager processor 500 and data processed by the manager processor 500. The manager storage 510 stores a control program 510A executed by the manager processor 500 and various other data. The manager storage 510 has a non-volatile storage area for storing a program and data in a non-volatile manner. Further, the manager storage 510 may be provided with a volatile storage area, and may be configured with a work area for temporarily storing a program executed by the manager processor 500 and data to be processed.

The manager communicator 51 includes communication hardware for performing wireless communication such as a network card based on a predetermined communication standard, and communicates with an apparatus connected to the global network GN based on a predetermined communication standard under the control of the manager controller 50. The apparatus connected to the global network GN includes the control server 7, or the like. Examples of communication standards used by the manager communicator 51 for communication include HTTP or WebSocket.

The manager display 52 includes a display panel such as a liquid crystal display panel, and displays various information according to the control of the manager controller 50.

The manager inputter 53 includes inputters such as an operation switch provided in the management apparatus 5, a keyboard connected to the management apparatus 5, and a touch panel, detects an operation on a user's inputter operating the management apparatus 5, and outputs the operation to the manager controller 50. Based on the input from the manager inputter 53, the manager controller 50 executes processing corresponding to the operation with respect to the inputter.

The control server 7 includes a server controller 70, a server network communicator 71, a server display 72, and a server inputter 73.

The server controller 70 includes a server processor 700 that is a processor which executes programs of a CPU, an MPU, or the like, and a server storage 710, and controls each part of the control server 7. The server controller 70 executes various processing in cooperation with hardware and software so that the server processor 700 reads a control program 710A stored in the server storage 710 and executes the processing.

In the following description, a configuration example for realizing various functions of the server controller 70 by the server processor 700 executing the control program 710A will be described.

The server storage 710 has a storage area for storing a program executed by the server processor 700 and data processed by the server processor 700. The server storage 710 stores the control program 710A executed by the server processor 700, an analysis program group management database 710B, an analysis data management database 710C, and various other data. Details of the analysis program group management database 710B and the analysis data management database 710C will be described later. The server storage 710 has a non-volatile storage area for storing a program and data in a non-volatile manner. Further, the server storage 710 may include a volatile storage area, and may be configured with a work area for temporarily storing a program executed by the server processor 700 and data to be processed.

The server network communicator 71 includes communication hardware for performing wireless communication such as a network card based on a predetermined communication standard, and communicates with an apparatus connected to the global network GN based on a predetermined communication standard under the control of the server controller 70. The apparatus connected to the global network GN referred to here includes the printer 3 and the management apparatus 5. Examples of communication standards used by the server network communicator 71 for communication include HTTP and WebSocket.

The server display 72 includes a display panel, and displays various information on the display panel under the control of the server controller 70.

The server inputter 73 includes a keyboard, a mouse, and other inputters, detects a user operation on the inputter, and outputs the detected operation to the server controller 70. Based on the input from the server inputter 73, the server controller 70 executes processing corresponding to the user's operation with respect to the inputter.

Next, basic operations of the POS terminal 4, the printer 3, and the control server 7 when accounting for a customer is performed at the checkout counter L will be described.

Figure 3:
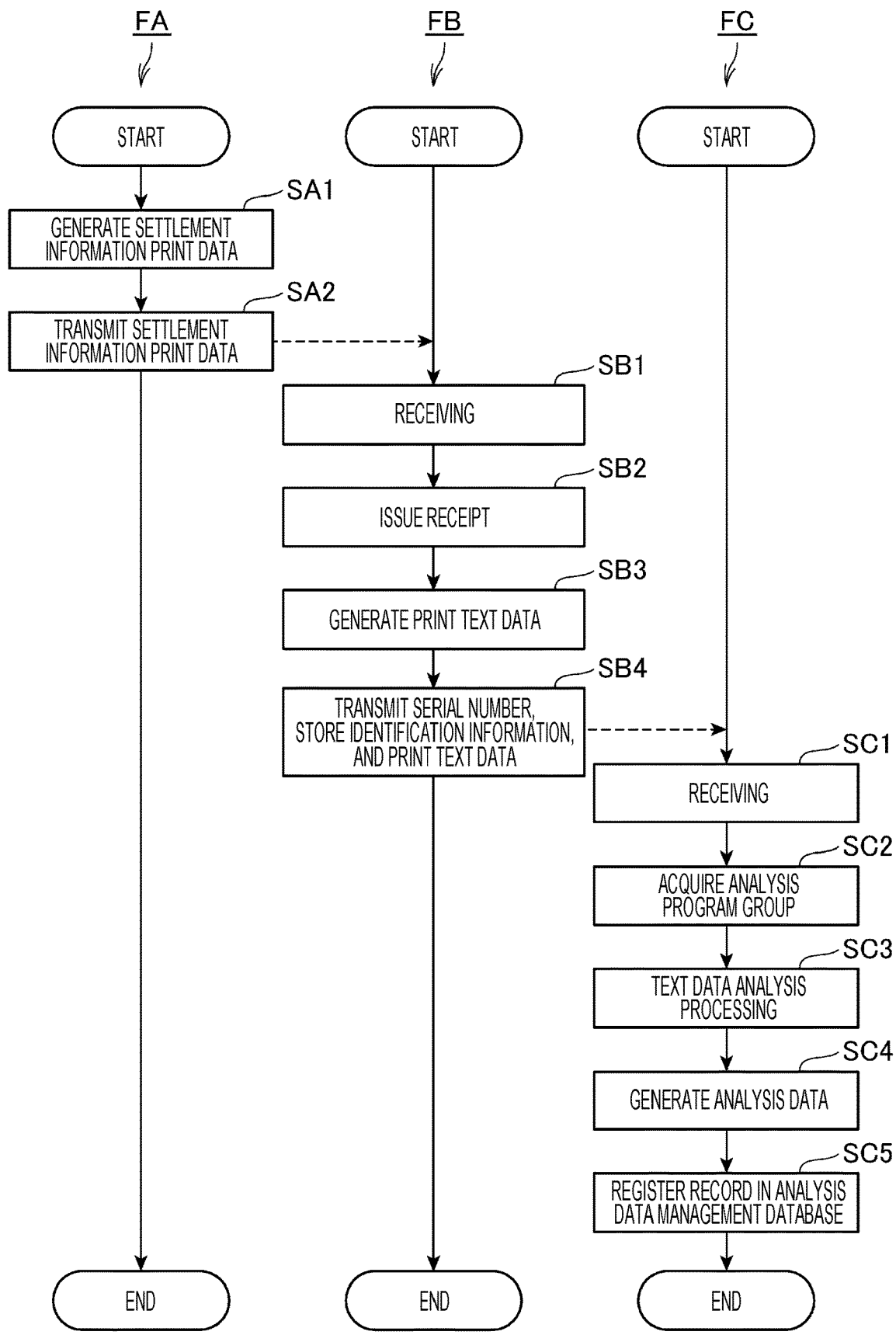
FIG. 3 is a flowchart showing operations of a POS terminal, a printer, and a control server.

FIG. 3 is a flowchart showing operations of the POS terminal 4, the printer 3 and the control server 7 when the accounting is performed at the checkout counter L. In FIG. 3, a flowchart FA shows the operation of the POS terminal 4, a flowchart FB shows the operation of the printer 3, and a flowchart FC shows the operation of the control server 7.

As shown in the flowchart FA in FIG. 3, an application executor 4000 of the POS terminal 4 executes accounting processing according to the customer's accounting, and generates settlement information print data KID based on the accounting processing (step SA1). The settlement information print data KID is print data ID for instructing issuance of a receipt R on which settlement information about settlement made in accounting is printed. The settlement information print data KID includes a plurality of control commands based on a command system of the printer 3. Note that the print data ID corresponds to printing information including information relating to printing such as a control command.

Regarding the processing of step SA1 in detail, the application executor 4000 causes the touch panel 42 to display a user interface that allows input for accounting. The application executor 4000 generates settlement information about the settlement made in the accounting, in response to an input of the cashier on the touch panel 42 or input from the printer 3 based on the customer's accounting. The specific contents of the settlement information will be described later with an example. Next, the application executor 4000 generates settlement information print data KID based on the generated payment information.

Figure 4:
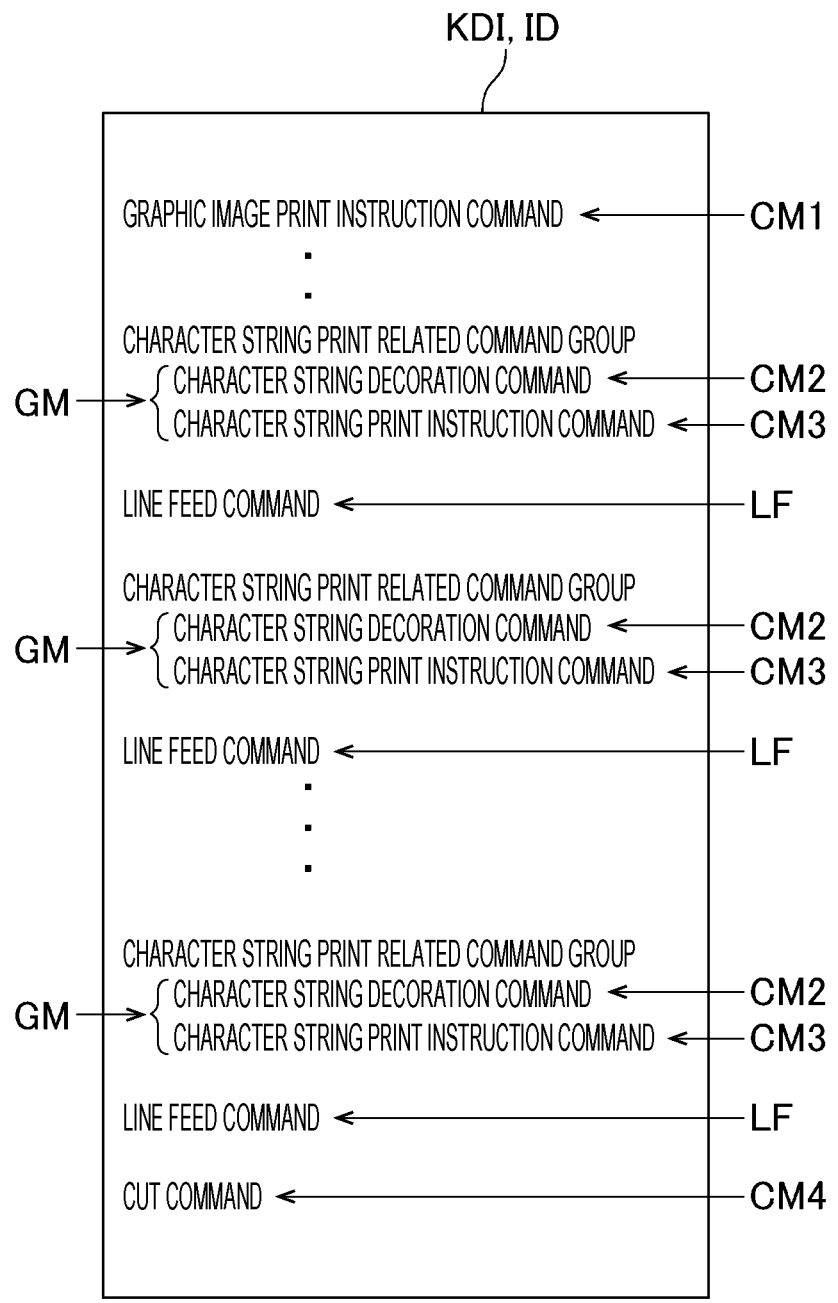
FIG. 4 is a diagram showing an example of settlement information print data.

FIG. 4 is a diagram showing an example of settlement information print data KID generated by the POS terminal 4.

As shown in FIG. 4, the settlement information print data KID includes a graphic image print instruction command CM1, a character string print related command group GM, a line feed command LF, and a cut command CM4. The character string print related command group GM includes a character string decoration command CM2 and a character string print instruction command CM3.

In the present embodiment, a target to which a character code is assigned is expressed as "character". The character includes a symbol to which a character code is assigned or a blank character to which a character code is assigned.

The graphic image print instruction command CM1 is a control command that includes a dedicated command code and image data such as bitmap data, and instructs printing of a graphic image based on the image data. The image data is data that holds information about the color of each dot in a dot matrix. The graphic image is not an image printed based on font data, but an image printed based on image data received from a device functioning as a host computer such as the POS terminal 4. Logo information J1 described later corresponds to the graphic image.

The character string print instruction command CM3 included in the character string print related command group GM is a control command for instructing printing of a character string for one line. The character string print instruction command CM3 includes the dedicated command code and character string information for instructing printing. The character string Information for instructing printing means a character code combination of one or a plurality of characters constituting the character string. The character code is indicated by, for example, a one-byte so-called ASCII code or the like. The character string decoration command CM2 included in the character string print related command group GM is a control command for specifying a decoration to be applied to a character string instructed to be printed by the character string print instruction command CM3. Examples of decoration applied to the character string include right-align, center-align, left-align, bold, add-underline, add-emphasis-point, black-and-white-reversal, rotation, enlargement, reduction, and the like.

The main substrate storage 310A of the printer 3 stores font data of printable characters. When printing a character string based on one character string print related command group GM, the main substrate controller 30A of the printer 3 executes the following processing.

First, the main substrate controller 30A converts each of the character codes that is included in the character string print instruction command CM3 included in the one character string print related command group GM, into corresponding font data by a predetermined method. Next, the main substrate controller 30A sets each of the font data to the decorated font data specified by the character string decoration command CM2 included in the one character string print related command group GM, and develops the font data in an image buffer configured in a predetermined storage area in line-by-line printing order based on the line feed command LF. Next, the main substrate controller 30A reads each of the font data developed in the image buffer, controls the printing executor 3C, and prints a character string for one line.

The line feed command LF is a command for instructing a line feed. The cut command CM4 is a command for instructing to cut roll paper.

As shown in the flowchart FA in FIG. 3, after generating the settlement information print data KID in step SA1, the application executor 4000 controls the POS terminal communicator 41 to transmit the generated settlement information print data KID to the printer 3 (step SA2).

As shown in the flowchart FB in FIG. 3, the sub-substrate controller 30B of the printer 3 controls the printer communicator 32B to receive the settlement information print data KID (step SB1). The sub-substrate controller 30B outputs the received settlement information print data KID to the main substrate controller 30A via the sub-substrate communicator 33B. Next, the main substrate controller 30A controls the printing executor 3C based on the settlement information print data KID received by the sub-substrate controller 30B in step SB1, and issues a receipt R (step SB2). The issued receipt R is passed to a customer.

Figure 5:
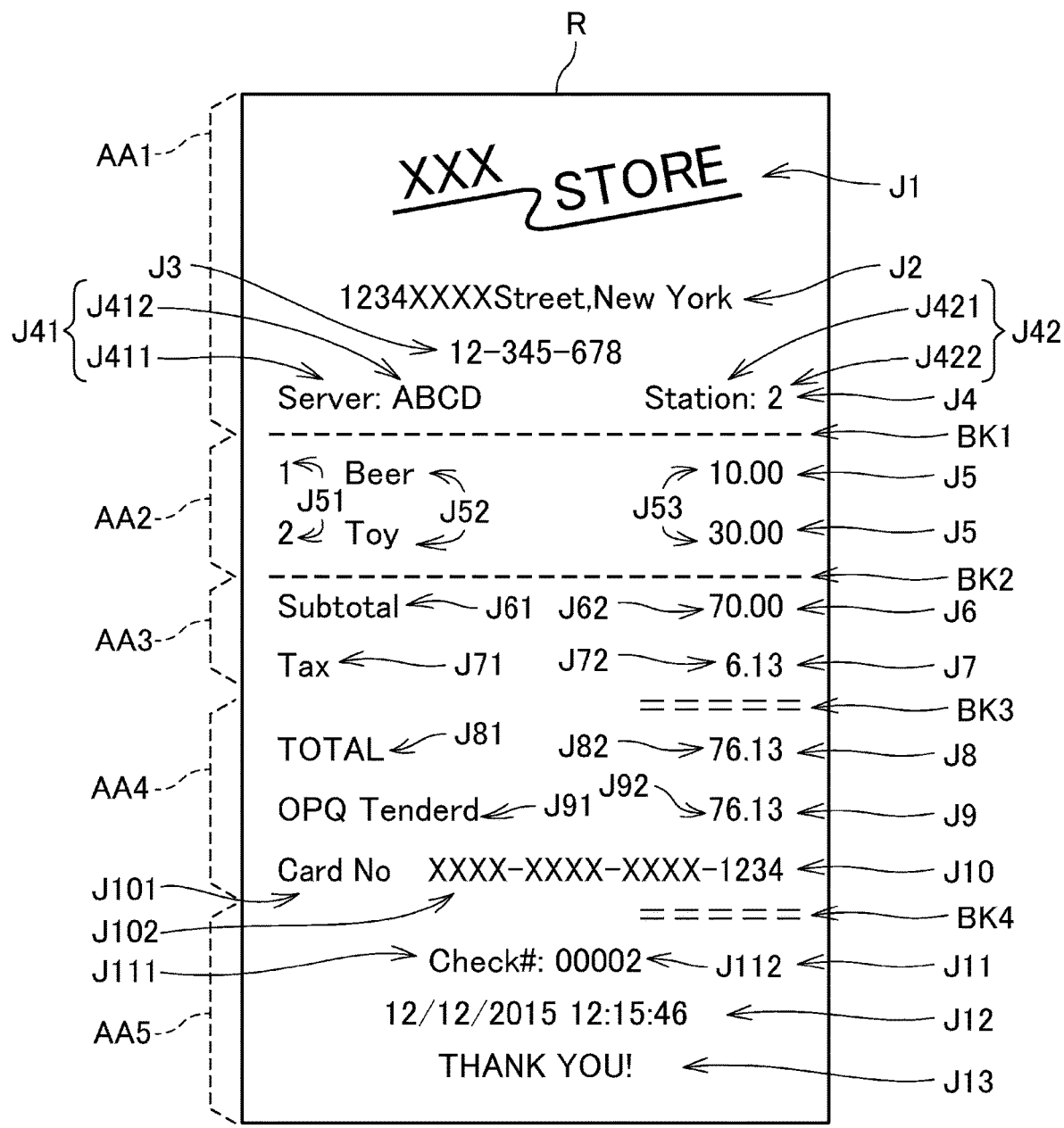
FIG. 5 is a diagram showing an example of a receipt.

An example of the receipt R issued by the printer 3 based on the settlement information print data KID is shown in FIG. 5.

The logo information J1 in which the name of the store T is designed is printed at the top of the receipt R illustrated in FIG. 5. The logo information J1 is printed based on the graphic image print instruction command CM1 described above.

In the receipt R shown in FIG. 5, store address information J2 representing the address of the store T in a form of a character string is printed below the logo information J1 in one line. The store address information J2 is printed based on the character string print related command group GM that includes the character string decoration command CM2 specifying a decoration for center-align and the character string print instruction command CM3 instructing printing of a character string representing the store address.

In the receipt R shown in FIG. 5, store telephone number information J3 representing the telephone number of the store T in a form of a character string is printed at one line below the store address information J2 in one line. The store telephone number information J3 is printed based on the character string print related command group GM that includes the character string decoration command CM2 specifying a decoration for center-align and the character string print instruction command CM3 instructing printing of a character string representing the telephone number of the store T.

In the receipt R shown in FIG. 5, checkout counter related information J4 is printed at one line below the store telephone number information J3. The checkout counter related information J4 has cashier information J41 and checkout counter information J42.

The cashier information J41 has cashier name information J412 representing the name of the cashier in a form of a character string. Since the cashier name information J412 is information indicating the name of the cashier, it corresponds to personal information. In the receipt R shown in FIG. 5, the cashier name information J412 is information consisting of a character string "ABCD". Further, the cashier information J41 has cashier indication information J411. The cashier indication information J411 is information printed on the left of the cashier name information J412 in the same line as the cashier name information J412, and representing that the cashier name information J412 is information indicating the cashier who issued the receipt R. In the receipt R shown in FIG. 5, the cashier indication information J411 is information consisting of a character string "Server:".

The checkout counter information J42 has checkout counter number information J422 representing an identification number identifying the checkout counter L in a form of a character string. In the receipt R shown in FIG. 5, the checkout counter number information J422 is information consisting of a character "2". The checkout counter information J42 has checkout counter number indication information J421. The checkout counter number indication information J421 is information printed on the left of the checkout counter number information J422 in the same line as the checkout counter number information J422, and representing that the checkout counter number information J422 is information indicating the identification number that identifies the checkout counter L. In the receipt R shown in FIG. 5, the checkout counter number indication information J421 is information consisting of a character string "Station: ".

The checkout counter information J42 is printed based on the character string print related command group GM including the character string decoration command CM2 for specifying the decoration for left-align and the character string print instruction command CM3 described below. The character string print instruction command CM3 is a control command for instructing printing of a character string in which a character string representing the cashier information J41, one or a plurality of blank characters, and a character string representing the checkout counter information J42 are continuous. The number of blank characters inserted between the character string representing cashier information J41 and the character string representing the checkout counter information J42 is adjusted so that the position of the checkout counter number information J422 of the checkout counter information J42 is positioned at the end of the "line".

In the receipt R shown in FIG. 5, area division information BK1 is printed at one line below the checkout counter related information J4. The area division information BK1 is a character string in which a predetermined number of characters "-" are continuously formed in one line. In the receipt R, a printing region is divided by the area division information BK1, and an area above the area division information BK1 is divided into areas. Hereinafter, in the receipt R, the area above the area division information BK1 is referred to as an "area AA1". The area AA1 shown in FIG. 5 includes the logo information J1, the store address information J2, the store telephone number information J3, and the checkout counter related information J4.

In the receipt R shown in FIG. 5, commodity information J5 is printed at one line below the area division information BK1. The commodity information J5 is information about the commodity purchased by a customer. The commodity information J5 is printed on the receipt R for each type of commodity purchased by the customer. Therefore, for example, when there are three types of commodities purchased by the customer, three commodity information J5 corresponding to each of the three types of commodities is printed. When a plurality of commodity information J5 is printed on the receipt R, the plurality of commodity information J5 is continuously printed one by one in different lines.

The commodity information J5 includes purchase quantity information J51, commodity name information J52, and unit price information J53. The purchase quantity information J51, the commodity name information J52, and the unit price information J53 are printed on the same line. The purchase quantity information J51 is information representing the purchase quantity of the corresponding commodity in a form of a character string. The commodity name information J52 is information representing the name of the corresponding commodity in a form of a character string. The unit price information J53 is information representing the unit price of the corresponding commodity in a form of a character string.

The commodity information J5 is printed based on a character string print related command group GM including the character string decoration command CM2 for specifying the decoration for left-align and the character string print instruction command CM3 described below. The character string print instruction command CM3 is a control command for instructing printing of a character string in which a character string representing the purchase quantity information J51, one space character, a character string representing the commodity name information J52, one or a plurality of blank characters, and a representing the unit price information J53 are continuous. The number of blank characters inserted between the character string representing commodity name information J52 and the character string representing the unit price information J53 is adjusted so that the position of the unit price information J53 is positioned at the end of the "line".

In the receipt R, area division information BK2 is printed at one line below the commodity information J5 that is printed at the bottom. The area division information BK2 is a character string in which a predetermined number of characters "-" are continuously formed in one line. In the receipt R, a printing region is divided by the area division information BK1 and the area division information BK2, and the area surrounded by the information is divided into areas. Hereinafter, in the receipt R, an area surrounded by the area division information BK1 and the area division information BK2 is referred to as an "area AA2". The area AA2 includes one or a plurality of commodity information J5.

In the receipt R shown in FIG. 5, subtotal amount related information J6 is printed at one line below the area division information BK2. The subtotal amount related information J6 has subtotal amount information J62 representing the subtotal amount in a form of a character string. The subtotal amount related information J6 has subtotal amount indication information J61. The subtotal amount indication information J61 is information printed on the left of the subtotal amount information J62 in the same line as the subtotal amount information J62, and representing that the subtotal amount information J62 is information indicating the subtotal amount in a form of a character string. As shown in FIG. 5, the subtotal amount indication information J61 relating to the receipt R is information consisting of a character string "Subtotal".

The subtotal amount related information J6 is printed based on a character string print related command group GM including the character string decoration command CM2 for specifying the decoration for left-align and the character string print instruction command CM3 described below. The character string print instruction command CM3 is a control command for instructing printing of a character string in which a character string representing the subtotal amount indication information J61, one or a plurality of blank characters, and a character string representing the subtotal amount information J62 are continuous. The number of blank characters inserted between the character string representing subtotal amount indication information J61 and the character string representing subtotal amount information J62 is adjusted so that the position of the subtotal amount information J62 is positioned at the end of the "line".

In the receipt R, the tax related information J7 is printed at one line below the subtotal amount related information J6. The tax related information J7 has tax amount information J72 representing the tax amount in a form of a character string. The tax related information J7 has tax indication information J71. The tax indication information J71 is information printed on the left of the tax amount information J72 in the same line as the tax amount information J72, and representing that the tax amount information J72 is information indicating the tax amount in a form of a character string. As shown in FIG. 5, the tax indication information J71 relating to the receipt R is information consisting of a character string "Tax".

The tax related information J7 is printed based on the character string decoration command CM2 similar to the subtotal amount related information J6 and the character string print related command group GM.

In the receipt R shown in FIG. 5, area division information BK3 is printed at one line below the tax related information J7. The area division information BK3 is a character string in which a predetermined number of characters "=" are continuously formed in one line with right-align. In the receipt R, a printing region is divided by the area division information BK2 and the area division information BK3, and the area surrounded by the information is divided into areas. Hereinafter, in the receipt R, an area surrounded by the area division information BK2 and the area division information BK3 is referred to as an "area AA3". The area AA3 includes the subtotal amount related information J6 and the tax related information J7.

In the receipt R shown in FIG. 5, total amount related information J8 is printed at one line below the area division information BK3. The total amount related information J8 has total amount information J82 representing the total amount in a form of a character string. The total amount related information J8 has total amount indication information J81. The total amount indication information J81 is information printed on the left of the total amount information J82 in the same line as the total amount information J82, and representing that the total amount information J82 is information indicating the total amount in a form of a character string. As shown in FIG. 5, the total amount indication information J81 relating to the receipt R is information consisting of a character string "TOTAL".

The total amount related information J8 is printed based on the character string decoration command CM2 similar to the subtotal amount related information J6 and the character string print related command group GM.

In the receipt R shown in FIG. 5, payment related information J9 is printed at one line below the total amount related information J8. The payment related information J9 has payment method information J91 representing the payment method of the customer regarding accounting in a form of a character string. In FIG. 5, the payment method information J91 is information consisting of a character string "OPQ Tendered". The payment related information J9 has payment amount information J92. The payment amount information J92 is information printed on the right of the payment method information J91 on the same line as the payment method information J91, and representing the amount paid by the payment method indicated by the payment method information J91 in a form of a character string. In FIG. 5, the payment amount information J92 is information consisting of a character string "76.13".

The payment related information J9 is printed based on the character string decoration command CM2 similar to the subtotal amount related information J6 and the character string print related command group GM.

In the receipt R shown in FIG. 5, card related information J10 is printed at one line below the payment related information J9. The card related information J10 is printed when the customer's payment in accounting is performed by a card such as a credit card or a point card. The card related information J10 has card number information J102 representing a card number in a form of a character string. Since the card number information J102 is information indicating the number assigned to each customer, it corresponds to personal information. In FIG. 5, the card number information J102 is information consisting of a character string "XXXX-XXXX-XXXX-1234". The card related information J10 has card number indication information J101. The card number indication information J101 is information printed on the left of the card number information J102 on the same line as the card number information J102, and representing that the card number information J102 is information indicating the card number in a form of a character string. In the receipt R shown in FIG. 5, the card number indication information J101 is information consisting of a character string of "Card No".

The card related information J10 is printed based on the character string decoration command CM2 similar to the subtotal amount related information J6 and the character string print related command group GM.

In the receipt R shown in FIG. 5, area division information BK4 is printed at one line below the card related information J10. The area division information BK4 is a character string in which a predetermined number of characters "=" are continuously formed in one line with right-align. In the receipt R, a printing region is divided by the area division information BK3 and the area division information BK4, and the area surrounded by the information is divided into areas. Hereinafter, in the receipt R, an area surrounded by the area division information BK3 and the area division information BK4 is referred to as an "area AA4". The area AA4 includes the total amount related information J8, the payment related information J9, and the card related information J10.

In the receipt R shown in FIG. 5, receipt identification related information J8 is printed at one line below the area division information BK4. The receipt identification related information J11 includes receipt identification information J112 representing identification information for identifying a receipt in a form of a character string. A value of the receipt identification information J112 is different for each receipt R. Further, the receipt identification related information J11 has receipt identification indication information J111. The receipt identification indication information J111 is information printed on the left of the receipt identification information J112 in the same line as the receipt identification information J112, and representing that the receipt identification information J112 is information indicating the identification information for identifying the receipt in a form of a character string. As shown in FIG. 5, the receipt identification indication information J111 relating to the receipt R is information composed of a character string "Check #:". The receipt identification related information J11 is printed based on the character string print related command group GM including the character string decoration command CM2 for specifying the decoration for center-align and the character string print instruction command CM3 described below. The character string print instruction command CM3 is a control command for instructing printing of a character string in which a character string representing the receipt identification indication information J111, one blank character, and a character string representing the receipt identification information J112 are continuous.

In the receipt R shown in FIG. 5, issuance date and time information J12 is printed, which represents the date when the receipt R is issued in a form of a character string below the receipt identification related information J11. The issuance date and time information J12 has date information J121 representing the date when the printer 3 issued the receipt R in a form of a character string, and time information J122 representing the time when the printer 3 issued the receipt R in a form of a character string. The issuance date and time information J12 is printed based on the character string print related command group GM that includes the character string decoration command CM2 specifying a decoration for center-align and the character string print instruction command CM3 instructing printing of a character string representing the date and time when the receipt R is issued. The character string print instruction command CM3 here is a control command for instructing printing a character string in which a character string representing the date information J121, one blank character, and a character string representing the time information J122 are continuous.

In the receipt R shown in FIG. 5, additional information J13 is printed at one line below the issuance date and time information J12. The additional information J13 is information including a character string, in one line, indicating gratitude to a customer who receives the receipt R. In the receipt R shown in FIG. 5, the additional information J13 is information consisting of a character string "THANK YOU!". The additional information J13 is printed based on the character string print related command group GM that includes the character string decoration command CM2 for specifying a decoration for center-align and the character string print instruction command CM3 for instructing printing of a character string representing the additional information J13.

Hereinafter, in the receipt R, an area surrounded by the area division information BK3 and the area division information BK4 is referred to as an "area AA4". In addition, hereinafter, in the receipt R, an area below the area division information BK4 is referred to as an "area AA5". The area AA5 includes the receipt identification related information J11, the issuance date and time information J12, and the additional information J13.

In the receipt R shown in FIG. 5, each information is printed by the printer 3 in the following layout based on the settlement information print data KID generated by the POS terminal 4. That is, in the area AA1, the logo information J1, the store address information J2, the store telephone number information J3, and the checkout counter related information J4 are printed in this order. In the area AA2, one or a plurality of commodity information J5 are printed. In the area AA3, the subtotal amount related information J6 and the tax related information J7 are printed in this order. In the area AA4, the total amount related information J8, the payment related information J9, and the card related information J10 are printed in this order. In the area AA5, the receipt identification related information J11, the issuance date and time information J12, and the additional information J13 are printed in this order. The information that we described above are settlement information.

Returning to the description of the flowchart FB in FIG. 3, after issuing the receipt R in step SB2, the sub-substrate controller 30B generates print text data ITD based on the settlement information print data KID (step SB3). The print text data ITD corresponds to text data. The processing of step SB3 will be described in detail below. The print text data ITD is data in which information to be printed is described as text, and corresponds to printing information for including information relating to printing.

In step SB3, the sub-substrate controller 30B extracts the character string print instruction command CM3 which is a control command relating to the printing of a character string and a line feed command LF from the settlement information print data KID. Next, based on the extracted control command, the sub-substrate controller 30B generates the print text data ITD in which the settlement information to be printed as characters on the receipt R is described as text. Here, the sub-substrate controller 30B describes the settlement information in a state in which a line feed performed in printing is reflected in the print text data ITD. Further, the sub-substrate controller 30B describes the settlement information in a state in which a decoration specified by the character string decoration command CM2 is not reflected in the print text data ITD. Therefore, even when the center-align or right-align is instructed as a decoration to be applied to a character string by the character string decoration command CM2, the decoration is not reflected when the text is described in the print text data ITD.

FIG. 6 is a diagram showing the contents of the print text data ITD generated based on the print data ID relating to the receipt R illustrated in FIG. 5. As apparent from comparison between FIG. 6 and FIG. 5, in the print text data ITD, the settlement information to be printed as characters on the receipt R is described as text in a state in which the order in printing and the line feed in printing are reflected.

Since the logo information J1 is a graphic image, it is not described in the print text data ITD. That is, information other than characters printed based on font data corresponding to a character code is not described in the print text data ITD.

As shown in the flowchart FB of FIG. 3, after the print text data ITD is generated in step SB3, the sub-substrate controller 30B transmits a serial number J14, the store identification information J15, and the print text data ITD generated in step SB3 to the control server 7 via the printer network communicator 31B (step SB4).

The serial number J14 is identification information uniquely assigned to the printer 3 at the manufacturing stage of the printer 3, and is stored in advance in a predetermined storage area of the main substrate storage 310A. In step SB4, the sub-substrate controller 30B acquires the serial number J14 stored in the predetermined storage area of the main substrate storage 310A via the sub-substrate communicator 33B. The store identification information J15 is identification information for identifying the store T in which the printer 3 is provided, and is stored in advance in a predetermined storage area of the main substrate storage 310A. In step SB4, the sub-substrate controller 30B acquires the store identification information J15 stored in a predetermined storage area of the main substrate storage 310A via the sub-substrate communicator 33B.

Although the printer 3 generates the print text data ITD from the print data ID in the present embodiment, the POS terminal 4 may generate the print text data ITD. In this configuration, the printer 3 skips the processing of step SB3 and transmits the print text data ITD received from the POS terminal 4 to the control server 7 together with the serial number J14 and the store identification information J15. The control server 7 may acquire the print data ID from the printer 3 and generate the print text data ITD.

As shown in the flowchart FC in FIG. 3, the server controller 70 of the control server 7 controls the server network communicator 71 to receive the serial number J14, the store identification information J15, and the print text data ITD, which are transmitted by the printer 3 (step SC1).

Next, the server controller 70 refers to the analysis program group management database 710B, and acquires an analysis program group BPG associated with the serial number J14 having the same value as the value of the serial number J14 received in step SC1 (step SC2).

Figure 7:
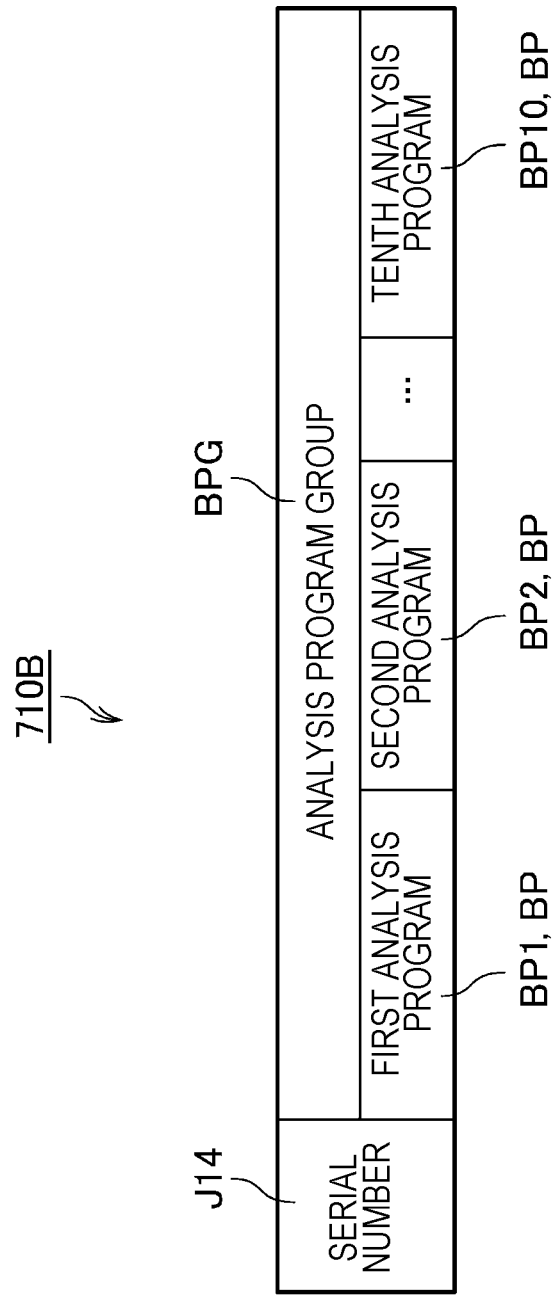
FIG. 7 is a diagram showing an example of an analysis program group management database.

FIG. 7 is a diagram schematically showing information included in one piece of record in the analysis program group management database 710B.

As shown in FIG. 7, the one piece of record in the analysis program group management database 710B includes a serial number J14 and an analysis program group BPG.

In FIG. 7, the analysis program group BPG has ten analysis programs BP of a first analysis program BP1 to a tenth analysis program BP10. Each of the analysis programs BP will be described later.

Returning to the description of the flowchart FC in FIG. 3, the server controller 70 executes text data analysis processing based on the acquired analysis program group BPG (step SC3). The text data analysis processing is executed by a control program 710A installed in the control server 7 and a function of the program associated with the control program 710A.

The text data analysis processing is processing of acquiring a text representing an item value corresponding to the item included in the settlement information from the print text data ITD. Hereinafter, acquiring the text representing the item value from the print text data ITD will be represented simply as, acquiring the item value from the print text data ITD. The text data analysis processing extracts an item value from the print text data ITD and acquires the item value from the print text data ITD by converting a notation format of the extracted item value into a notation format that can be utilized by a user, as necessary. Note that depending on the item value, there is an item value in which the conversion of the notation format is not performed and an item value in which the conversion of the notation format is performed. Therefore, in the text data analysis processing, depending on the item, the notation format of the last acquired item value may be the notation format at the time extracted from the print text data ITD and the notation format after the conversion.

In the present embodiment, as items included in the settlement information include 10 items of a store address information item, a store telephone number information item, a checkout counter number information item, a commodity information item, a subtotal amount information item, a tax information item, a total amount information item, a payment method information item, a receipt identification information item, and an issuance date and time information item. These items will be described later.

As described above, the analysis program group BPG of the present embodiment has a plurality of analysis programs BP. One analysis program BP is a program described in a predetermined script language and has a function of acquiring an item value from the print text data ITD for one item in accordance with an analysis rule indicated by the described processing flow.

The analysis program group BPG acquires item values for a number of items corresponding to the number of analysis programs BP from one print text data ITD. In FIG. 7, the analysis program group BPG is configured with ten analysis programs BP of a first analysis program BP1 to a tenth analysis program BP10. That is, in the case of FIG. 7, the analysis program group BPG has a function of acquiring item values for each of the above ten items.

In the present embodiment, the analysis program group BPG has the first analysis program BP1 having a function of acquiring an item value for the store address information item.

The store address information item is an item associated with the store address information J2 indicating the address of the store T where the receipt R is issued as an item value.

The analysis program group BPG has the second analysis program BP2 having a function of acquiring an item value for the store telephone number information item.

The telephone number information item is an item associated with the store telephone number information J3 indicating the telephone number of the store T where the receipt R is issued as an item value.

The analysis program group BPG has a third analysis program BP3 having a function of acquiring an item value for the checkout counter number information item.

The checkout counter number information item is an item associated with the checkout counter number information J422 as an item value.

The analysis program group BPG has a fourth analysis program BP4 having a function of acquiring item values for the commodity information item.

The commodity information item includes a commodity name information item, a purchase quantity information item, and a unit price information item.

The commodity name information item is an item associated with the commodity name information J52 as an item value.

The purchase quantity information item is an item associated with the purchase quantity information J51 as an item value.

The unit price information item is an item associated with the unit price information J53 as an item value.

The analysis program group BPG has a fifth analysis program BP5 having a function of acquiring item values for the subtotal amount information item.

The subtotal amount information item is an item associated with the subtotal amount information J62 as an item value.

The analysis program group BPG has a sixth analysis program BP6 having a function of acquiring item values for the tax information item.

The tax information item is an item associated with the tax amount information J72 as an item value.

The analysis program group BPG has a seventh analysis program BP7 having a function of acquiring item values for the total amount information item.

The total amount information item is an item associated with the total amount information J 82 as an item value.

The analysis program group BPG has an eighth analysis program BP8 having a function of acquiring item values for the payment related information item.

The payment related information item includes a payment method information item and a payment amount information item.

The payment method information item is an item associated with the payment method information J91 as an item value. The payment amount information item is an item associated with the payment amount information J92 as an item value.

The analysis program group BPG has a ninth analysis program BP9 having a function of acquiring an item value for the receipt identification information item.

The receipt identification information item is an item associated with the receipt identification information J112 as an item value.

The analysis program group BPG has a tenth analysis program BP10 having a function of acquiring item values for the issuance date and time information item.

The issuance date and time information item is an item associated with the issuance date and time information J12 as an item value.

Although the item values described above include not only information represented as actual numerical values but information represented as a character string, both cases are treated as item values in the present embodiment.

Here, the analysis rules of the analysis program BP will be specifically described by taking the seventh analysis program BP7 as an example.

For example, the analysis rule of the seventh analysis program BP7 is a rule to perform a keyword search for the character string "TOTAL" included in the area AA4 of the print text data ITD, exclude a blank character in the line having the character string "TOTAL", extract the character string positioned to the right of the character string "TOTAL" as an item value of the total amount information item, and convert the notation format of the extracted item value into a notation format from which a symbol indicating a digit separator is removed. When the seventh analysis program BP7 is applied to the print text data ITD shown in FIG. 6, the total amount information J82 represented in a character string "76.13" is acquired from the print text data ITD in the text data analysis processing.

In the present embodiment, although the first to tenth identifiers are given to the analysis program BP, the identifier indicates that the item to which the item value is to be acquired is different. Therefore, for example, the first analysis program BP1 included in a certain analysis program group BPG and the first analysis program BP1 included in an analysis program group BPG which is different from the certain analysis program group BPG, do not necessarily have the same analysis rule for acquiring item values.

The items analyzed by the analysis program group BPG are not limited to those described above. The items analyzed by the analysis program group BPG may include various items, in addition to the items described above, for example, a refund presence information item in which information indicating the presence or absence of refund is associated as an item value, and a payment method information item in which information indicating a payment method is associated as an item value. In this case, the analysis program group BPG is configured to include the analysis program BP of the corresponding item. The number of analysis programs BP included in the analysis program group BPG is not necessarily limited to ten, and may be different for each analysis program group BPG. The type of analysis program BP included in the analysis program group BPG may be different for each analysis program group BPG.

The analysis program group BPG shown in FIG. 7 has a plurality of analysis programs BP for acquiring item values with respect to the print text data ITD based on the settlement information print data KID. However, the print text data ITD for which the analysis program group BPG acquires the item value may be print text data ITD based on the print data ID instructing issuance of an attendance sheet, or print text data ITD based on the print data ID instructing issuance of a report. In this case, the analysis program group BPG has one or a plurality of analysis programs BP for acquiring item values in accordance with the type of the print text data ITD.

Returning to the description of the flowchart FC in FIG. 3, the server controller 70 generates analysis data BD based on the processing result of the text data analysis processing in step SC3 (step SC4). The analysis data BD is data in a JSON format in which each of the items described above is associated with the acquired item value. In the analysis data BD, information indicating that the item value could not be acquired from the print text data ITD is described for each item as necessary. A null value is taken as an example of information indicating that the item value cannot be acquired from the print text data ITD.

After generating the analysis data BD, the server controller 70 generates a record to be registered in the analysis data management database 710C based on the generated analysis data BD. Then, the server controller 70 registers the generated record in the analysis data management database 710C (step SC5).

Figure 8:
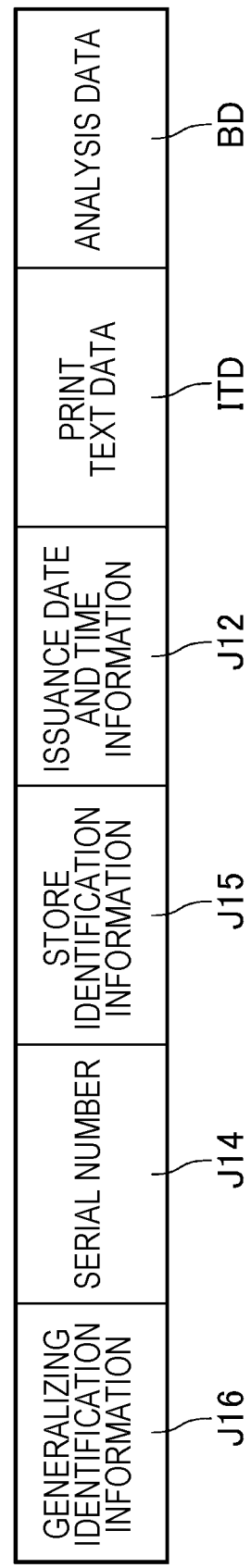
FIG. 8 is a diagram showing an example of an analysis data management database.

FIG. 8 is a diagram schematically showing information stored in one piece of record in the analysis data management database 710C.

As shown in FIG. 8, the generalizing identification information J16, the serial number J14, the store identification information J15, the issuance date and time information J12, the print text data ITD, and the analysis data BD are store in one piece of record in the analysis data management database 710C.

The generalizing identification information J16 generated by the server controller 70 using a predetermined method is stored in one piece of record in the analysis data management database 710C. The generalizing identification information J16 is identification information that uniquely identifies the analysis data BD.

The serial number J14, the store identification information J15, and the print text data ITD received by the control server 7 in step SC1 are stored in one piece of record in the analysis data management database 710C.

The issuance date and time information J12 acquired as an item value in the text data analysis processing is stored in one piece of record in the analysis data management database 710C.

In the control server 7, a plurality of Web application programming interfaces (APIs) are registered. The control server 7 can provide information required by a user by performing processing using the registered Web API based on the analysis data management database 710C in response to the request from the browser of the external device. The user mentioned here is, for example, a person who has an operation authority of the management apparatus 5, such as an owner who operates the store T, an employee of the management company that manages the store T, or a responsible person of the store T.

For example, the user of the management apparatus 5 launches a browser of the management apparatus 5 and instructs access to a predetermined URL of the control server 7 relating to the display of a user interface for acquiring item values from the control server 7. The URL is notified to the user in advance by a predetermined method. The browser executor 5000 of the management apparatus 5 accesses a predetermined URL of the control server 7 in accordance with the user's instruction. The server controller 70 of the control server 7 transmits an HTML file for displaying the above-mentioned user interface to the management apparatus 5 in response to the access to the predetermined URL. The management apparatus 5 causes the manager display 52 to display the user interface described above based on the received HTML file. Here, it is assumed that the total amount information J82 is specified in the user interface displayed by the management apparatus 5. Then, the browser executor 5000 requests the control server 7 for the total amount information J82 relating to the specific receipt R as an HTTP request. The server controller 70 of the control server 7 transmits the total amount information J82 relating to the specific receipt R as an HTTP response to the management apparatus 5 using the analysis data BD of the analysis data management database 710C. Thereby, the user of the management apparatus 5 can utilize the total amount information J82 printed on the specific receipt R.

As described above, according to the print data ID received from the POS terminal 4, the printer 3 of the present embodiment can issue three types of printed matters of the receipt R, the attendance sheet, and the report. Therefore, in the present embodiment, the print data ID transmitted by the POS terminal 4 to the printer 3 includes print data ID for instructing printing of an attendance sheet and print data ID for instructing printing of a report other than the settlement information print data KID. In the following description, the print data ID for instructing printing of an attendance sheet is referred to as attendance sheet print data. The print data ID for instructing printing of a report is referred to as report print data.

When the control server 7 acquires the print text data ITD from the printer 3, the control server 7 performs text data analysis processing using the analysis program group BPG. Therefore, the control server 7 can acquire an item value from the print text data ITD based on the attendance sheet print data and the report print data, other than the print text data ITD based on the settlement information print data KID.

However, a person who has an operation authority of the management apparatus 5, such as an owner who operates the store T or an employee of the management company that manages the store T, does not necessarily want to utilize information printed on all types of printed matter. For example, a person having the operation authority of the management apparatus 5 who wants to acquire the commodity information J5 for each receipt R does not necessarily want to acquire information about the attendance. In this case, when the printer 3 is configured to transmit the print text data ITD to the control server 7 regardless of the type of the printed matter, the print text data ITD based on the attendance sheet print data is unnecessarily transmitted to the control server 7. As a result, the control server 7 may unnecessarily execute text data analysis processing, and the processing efficiency of the control server 7 is reduced.

Further, when the print text data ITD is transmitted from the printer 3 to the control server 7, that is, when the print text data ITD is transmitted to the outside of the one store system 2, there may be information that is not desired to be included in the print text data ITD. As this information, personal information relating to an individual such as the cashier name information J412 or the card number information J102 in FIG. 5 can be cited as an example. In addition, as personal information about the individual, information such as name, address, telephone number, occupation, date of birth, age, gender, educational background, information such as family, information such as accounts relating to banks and securities companies, information such as membership relating to shopping or coupons or travel, information about a card settlement, information about an electronic settlement, and information about a check payment can be cited as examples.

In view of the above circumstances, the printer 3 of the present embodiment executes the following operation.

Figure 9:
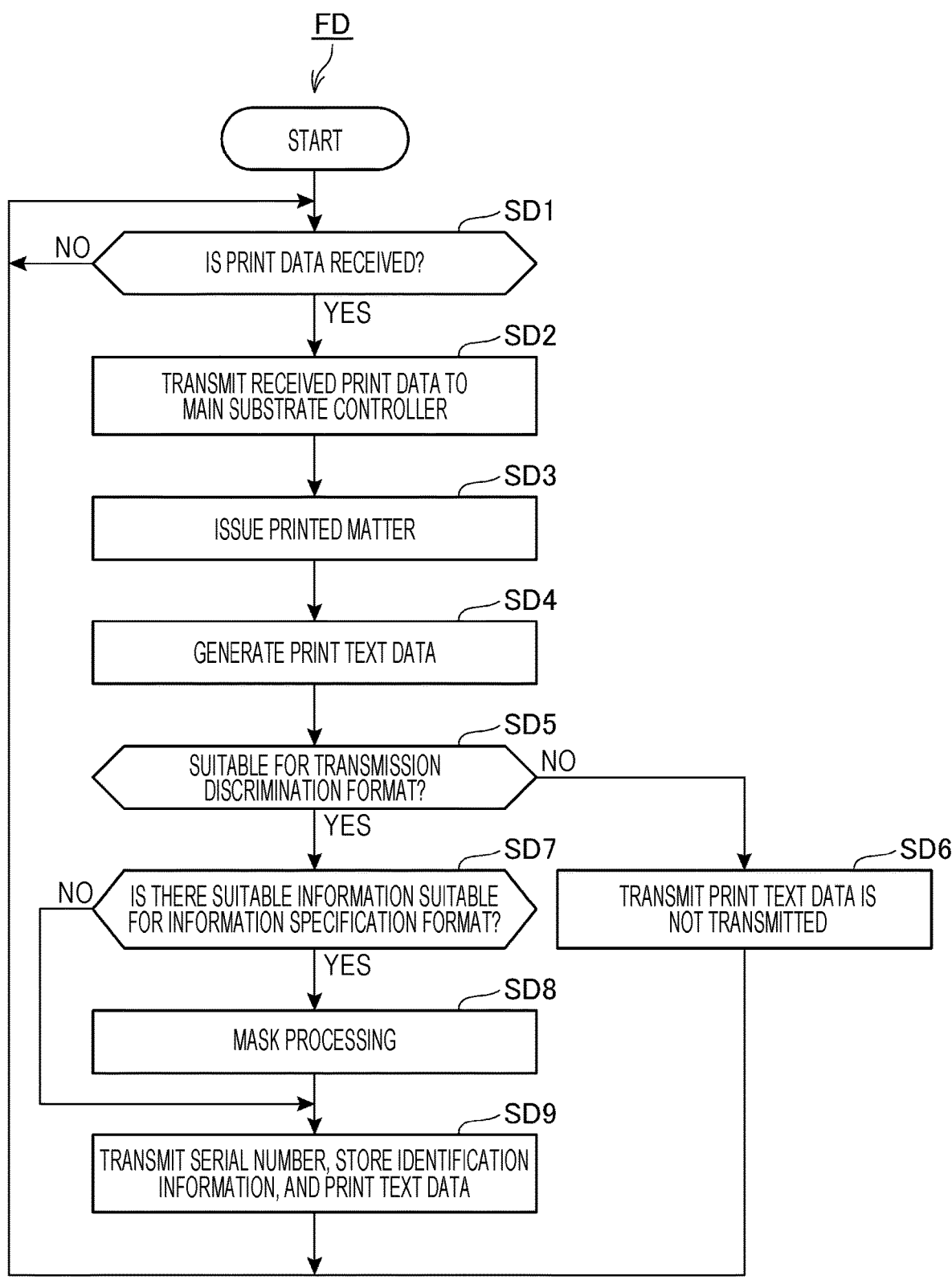
FIG. 9 is a flowchart showing an operation of the printer.

FIG. 9 is a flowchart showing an operation of the printer 3.

In the description of an operation of the printer 3 using FIG. 9, the operation in a case of transmitting the print text data ITD based on the settlement information print data KID to the control server 7 is taken as an example.

The sub-substrate controller 30B of the sub-substrate 3B of the printer 3 discriminates whether or not the print data ID is received from the POS terminal 4 via the printer communicator 32B (step SD1).

When it is discriminated that the print data ID is not received from the POS terminal 4 (step SD1: NO), the sub-substrate controller 30B returns the processing to step SD1 and discriminates again whether or not the print data ID is received from the POS terminal 4.

On the other hand, when it is discriminated that the print data ID is received from the POS terminal 4 (step SD1: YES), the sub-substrate controller 30B transmits the received print data ID to the main substrate controller 30A via the sub-substrate communicator 33B (step SD2).

The main substrate controller 30A issues a printed matter by the printing executor 3C based on the print data ID received from the sub-substrate controller 30B (step SD3).

When the print data ID received from the POS terminal 4 is the settlement information print data KID, the main substrate controller 30A issues a receipt R by the printing executor 3C in step SD3.

When the print data ID received from the POS terminal 4 is the attendance print data, the main substrate controller 30A issues an attendance sheet by the printing executor 3C in step SD3.

When the print data ID received from the POS terminal 4 is the report print data, the main substrate controller 30A issues an report by the printing executor 3C in step SD3.

Next, the sub-substrate controller 30B generates print text data ITD based on the print data ID received from the POS terminal 4 (step SD4).

Next, the sub-substrate controller 30B discriminates whether or not the format of the generated print text data ITD is adapted to the transmission discrimination format indicated by the transmission discrimination format information 330B stored in the sub-substrate storage 310B (step SD5). The transmission discrimination format corresponds to a first format.

In the present embodiment, the format indicates a format such as a description format of information in data or a notation format of the described information itself.

The transmission discrimination format is a format of print text data ITD used for discrimination to transmit print text data ITD relating to the printing of a certain specific type of a printed matter to the control server 7. The transmission discrimination format information 330B is information indicating a transmission discrimination format.

One transmission discrimination format indicates a format of the print text data ITD relating to the printing of one type of a printed matter. An example of the transmission discrimination format is given below. In general, the additional information J13 is printed on the receipt R but is not printed on the attendance sheet and the report. Therefore, the format of the print text data ITD based on the settlement information print data KID is a format having the additional information J13 as compared with the print text data ITD based on other print data ID. Therefore, when the transmission discrimination format is a transmission discrimination format used for discrimination to transmit the print text data ITD relating to the printing of the receipt R to the control server 7, the transmission determination format indicates, for example, the format of the print text data ITD "having additional information J13".

The specific example of the transmission discrimination format is merely an example. Therefore, the transmission discrimination format may be any format that indicates the format of the print text data ITD specific to a certain specific type of a printed matter.

In step SD5, the sub-substrate controller 30B analyzes the print text data ITD generated in step SD4, and discriminates whether or not the format of the print text data ITD is adapted to the transmission discrimination format based on the analysis result.

For example, the sub-substrate controller 30B performs a character string search of the additional information J13 represented in a character string "THANK YOU!" from the print text data ITD generated in step SD4 using a predetermined analysis program. When the additional information J13 can be searched, the sub-substrate controller 30B determines that the format of the print text data ITD generated in step SD4 is a format having the additional information J13. Next, when the transmission discrimination format indicates a format of "having additional information J13", the sub-substrate controller 30B makes affirmative discrimination in step SD5. On the other hand, when the additional information J13 cannot be searched, the sub-substrate controller 30B determines that the format of the print text data ITD generated in step SD4 is a format that does not have the additional information J13. Next, when the transmission discrimination format does not indicate a format of "having additional information J13", the sub-substrate controller 30B makes negative discrimination in step SD5.

An analysis program for analyzing the print text data ITD in step SD5 is stored in advance in the sub-substrate storage 310B for performing appropriate analysis.

When it is discriminated that the format of the print text data ITD generated in step SD4 is not adapted to the transmission discrimination format (step SD5: NO), the sub-substrate controller 30B does not transmit the print text data ITD generated in step SD4 to the control server 7 (step SD6).

On the other hand, when it is discriminated that the format of the print text data ITD generated in step SD4 is adapted to the transmission discrimination format (step SD5: YES), the sub-substrate controller 30B executes the processing of step SD7. That is, the sub-substrate controller 30B discriminates whether or not there is information, among the information included in the print text data ITD, adapted to the information specification format indicated by the information specification format information 340B stored in sub-substrate storage 310B (step SD7). The information specification format corresponds to a second format.

The information specification format is a format for specifying the information to be masked among the information included in the print text data ITD when the print text data ITD is transmitted to the control server 7.

In the present embodiment, the information specification format is a format for specifying the personal information among the information included in the print text data ITD, and there are a format for a character string corresponding to the personal information and a format for a layout of printing of the personal information. Each of the information specification formats will be described in detail with examples.

[Format for Character String]

For example, as a format for a character string, the information specification format indicates a format "A series of character strings that have the character string "XXXX-XXXX-XXXX-", four characters from the end are numbers, and do not contain a blank character."

Further, for example, as a format for a character string, the information specification format indicates a format "A character string that follows the character string "Server:" contains at least a plurality of alphabetic characters, and does not contain a blank character.".

[Format for Layout]

For example, as a format for a layout, the information specification format indicates a format "A series of character strings that do not contain a blank character, and that print on the right side based on the blank character among the strings printed in one line at the bottom of the area AA4".

For example, as a format for a layout, the information specification format indicates a format "A character string that removes a blank character on the right side based on the string ":" of the string on the left side based on the blank character, among the strings printed in one line at the bottom of the area AA1".

In step SD7, when it is discriminated that there is information adapted to the information specification format among the information included in the print text data ITD (step SD7: YES), the sub-substrate controller 30B performs mask processing to mask information adapted to the information specification format (step SD8). An aspect of a mask may be an aspect of converting information adapted to the information specification format into other information, or an aspect of deleting information adapted to the information specification format.

FIG. 10 is a diagram showing an example of the print text data ITD when the information adapted to the information specification format is converted into other information.

The print text data ITD shown in FIG. 10 is the print text data ITD in which information adapted to the information specification format is masked among the information included in the print text data ITD in FIG. 6.

The personal information in the print text data ITD in FIG. 6 is the cashier name information J 412 represented by the character string "ABCD" following the character string "Server:", and the card number information J102 represented by the character string "XXXX-XXXX-XXXX-1234". Therefore, as apparent from comparison between FIG. 10 and FIG. 6, the cashier name information J 412 represented by the character string "ABCD" following the character string "Server:" is converted to information represented by the character string "XXXX" in the print text data ITD in FIG. 10. Further, as is clear from the comparison between FIG. 10 and FIG. 6, the card number information J102 represented by the character string "XXXX-XXXX-XXXX-1234" is converted to information represented by the character string "XXXX-XXXX-XXXX-XXXX".

As described above, as apparent from the comparison between the print text data ITD shown in FIG. 10 and FIG. 6, the personal information is masked so that the print text data ITD does not contain personal information.

FIG. 11 is a diagram showing an example of the print text data ITD when the information adapted to the information specification format is deleted.

Similar to the print text data ITD shown in FIG. 10, the print text data ITD shown in FIG. 11 is the print text data ITD in which the information adapted to the information specification format is masked among the information included in the print text data ITD in FIG. 6.

As apparent from comparison between FIG. 11 and FIG. 6, the cashier name information J412 represented by the character string "ABCD" following the character string "Server:" is deleted. Further, as is clear from the comparison between FIG. 11 and FIG. 6, the card number information J102 represented by the character string "XXXX-XXXX-XXXX-1234" is deleted. Note that deletion is the same as converting characters into blank characters.

In this way, as apparent from the comparison between the print text data ITD shown in FIG. 11 and FIG. 6, the personal information is masked so that the print text data ITD does not contain personal information.

Referring to FIG. 9, after executing the mask processing in step SD8, the sub-substrate controller 30B transmits the print text data ITD for which the mask processing is executed, together with the serial number J14 and the store identification information J15 (step SD9).

Returning to the description of step SD7, when it is discriminated that there is no information adapted to the information specification format among the information included in the print text data ITD (step SD7: NO), the sub-substrate controller 30B transmits the print text data ITD together with the serial number J14 and the store identification information J15 without performing the mask processing (step SD9).

As described above, the sub-substrate controller 30B of the sub-substrate 3B of the printer 3 discriminates whether or not the format of the print text data ITD is adapted to the transmission discrimination format. When it is discriminated that the format of the print text data ITD is adapted to the transmission discrimination format, the sub-substrate controller 30B converts or deletes the information adapted to the information specification format into other information among the information included in the print text data ITD, and transmits the print text data ITD, for which the mask processing is executed, to the control server 7. Thereby, the sub-substrate controller 30B can transmit only the print text data ITD adapted to the transmission discrimination format to the control server 7, and it is possible to prevent the print text data ITD relating to the printing of various printed matters from being unnecessarily transmitted to the control server 7. The sub-substrate controller 30B can transmit, to the control server 7, appropriate print text data ITD which does not include information adapted to the information specification format. Therefore, in the transmission of the print text data ITD to the control server 7, the sub-substrate controller 30B can transmit appropriate print text data ITD along with preventing transmission of the print text data ITD unnecessarily. The sub-substrate controller 30B can prevent the control server 7 from unnecessarily executing the text data analysis processing, and can prevent the processing efficiency of the control server 7 from being reduced.

As described above, the transmission discrimination format is a format of the print text data ITD relating to the printing of a specific type of a printed matter among printed matters printed by the printer 3. Therefore, the sub-substrate controller 30B can transmit only the print text data ITD relating to the printing of the specific type of a printed matter among the printed matters that can be printed by the printer 3 to the control server 7. As a result, the sub-substrate controller 30B can prevent the print text data ITD from being transmitted to the control server 7 for all types of printed matters that can be printed by the printer 3, thereby, it is possible to prevent the print text data ITD from being transmitted to the control server 7 unnecessarily. In the description using FIG. 9, only the print text data ITD based on the settlement information print data KID is transmitted. As a result, the sub-substrate controller 30B can prevent the print text data ITD relating to the printing of printed matter other than the receipt R from being transmitted to the control server 7. Therefore, the sub-substrate controller 30B can prevent the print text data ITD unnecessary for the text data analysis processing of the receipt R from being unnecessary transmitted to the control server 7.

As described above, the information specification format includes a format relating to a character string corresponding to personal information and a format relating to a printing layout of the personal information. Thereby, the sub-substrate controller 30B can transmit the print text data ITD not containing personal information to the control server 7. Therefore, even when it is not desired to transmit personal information to the outside of the store system 2, the sub-substrate controller 30B can transmit appropriate print text data ITD to the control server 7. Even when it is not desired to transmit personal information to the outside of the store system 2, the control server 7 can perform text data analysis processing based on the print text data ITD received from the printer 3.

In the description using FIG. 9, the configuration has been illustrated in which the additional information J13 is used as a key to discriminate whether or not the print text data ITD format is adapted to the transmission discrimination format when transmitting the print text data ITD based on the settlement information print data KID to the control server 7. However, when the additional information J13 used as the key is changed due to the change of the POS terminal 4 in the store system 2 or the change of the settlement information print data KID, the sub-substrate controller 30B cannot transmit the print text data ITD based on the settlement information print data KID to the control server 7. Depending on a user of the management apparatus 5, there may be a case where it is desired to transmit print text data ITD based on print data ID other than the payment information print data KID to the control server 7. There may also be a case where the format of a character string of personal information and the layout of printing of personal information are changed due to the change of the POS terminal 4 in the store system 2 or the change of the settlement information print data KID or the like. In this case, the sub-substrate controller 30B cannot accurately discriminate whether or not the personal information is adapted to the information specification format, and there is a possibility that the print text data ITD including the personal information may be transmitted to the control server 7. Further, depending on a user of the management apparatus 5, there may be a case where it is desired not to contain information other than personal information in the print text data ITD when transmitting the print text data ITD to the control server 7. The information other than personal information is, for example, the store telephone number information J3.

The information processing system 1 is configured such that the management apparatus 5 can change the transmission discrimination format and the information specification format described above for each printer 3.

FIG. 12 is a flowchart showing operations of the management apparatus 5, the control server 7, and the printer 3. In FIG. 12, a flowchart FE shows the operation of the management apparatus 5, a flowchart FF shows the operation of the control server 7, and a flowchart FG shows the operation of the printer 3.

A user of the management apparatus 5 launches a browser of the management apparatus 5 and instructs access to a predetermined URL of the control server 7 which is related to a setting user interface display for setting the transmission discrimination format and the information specification format (step SX1). The URL is notified to the user in advance by a predetermined method.

The browser executor 5000 of the manager controller 50 of the management apparatus 5 accesses a predetermined URL of the control server 7, that is related to a setting user interface display, in response to the instruction of the user of the management apparatus 5 (step SE1).

As shown in the flowchart FF, the server controller 70 of the control server 7 transmits an HTML file, that displays a first input user interface for inputting a user ID and a password corresponding to the user ID, to the management apparatus 5 by the server network communicator 71 in order to display the setting user interface in response to access to the predetermined URL by the browser executor 5000 (step SF1).

The browser executor 5000 receives the HTML file for displaying the first input user interface by the manager communicator 51 (step SE2).

Next, the browser executor 5000 causes the manager display 52 to display the first input user interface based on the received HTML file (step SE3).

The first input user interface has an input field for inputting a user ID, an input field for inputting a password corresponding to the user ID, and a confirmation button for confirming an input to the input fields.

When the confirmation buttons inserted in the corresponding input fields of the user ID and the password are operated (step SX2), the browser executor 5000 transmits the input user ID and the input password to the control server 7 via the manager communicator 51 (step SE4).

The server controller 70 of the control server 7 receives the user ID and the password by the server network communicator 71 (step SF2), and discriminates whether or not the combination of the received user ID and password matches the combination registered in advance (step SF3).

When it is discriminated that the combinations match (step SF3: YES), the server controller 70 transmits the HTML file that displays a second input user interface to the management apparatus 5 via the server network communicator 71 (step SF4).

The browser executor 5000 receives the HTML file for displaying the second input user interface by the manager communicator 51 (step SE5). Next, the browser executor 5000 causes the manager display 52 to display the second input user interface based on the received HTML file (step SE6).

The second input user interface is a user interface that displays a list of the printer related information relating to the printer 3 so as to be selectable for the number provided in the store T associated with the user ID input to the first input user interface. The printer related information is information in which the name of the store T where the printer 3 is provided, the serial number J14 of the printer 3, and the like are associate. The printer related information is appropriately generated and associated with an appropriate user ID in advance.

When one printer related information is selected in the second input user interface (step SX3), the browser executor 5000 transmits the serial number J14 of the printer 3 included in the selected printer related information to the control server 7 (step SE7).

When receiving the serial number J14 (step SF5), the server controller 70 of the control server 7 transmits, to the management apparatus 5, an HTML file for displaying a setting user interface that is related to the printer 3 indicated by the serial number J14 (step SF6).

The browser executor 5000 receives the HTML file for displaying the setting user interface by the manager communicator 51 (step SE8). Next, the browser executor 5000 causes the manager display 52 to display the setting user interface based on the received HTML file (step SE9).

The setting user interface has, for example, a user interface for setting the transmission discrimination format, a user interface for setting the information specification format, and confirmation buttons for confirming formats set in each user interface.

When the confirmation button in the setting user interface is operated (step SX4), the browser executor 5000 transmits the transmission discrimination format information 330B indicating the transmission discrimination format set in the setting user interface and the information specification format information 340B indicating the information specification format set in the setting user interface, to the control server 7 via the manager communicator 51 (step SE10). In step SE10, the serial number J14 of the printer 3 to be set in the setting user interface is added to the two format information, and transmitted to the control server 7 by the browser executor 5000.

The server controller 70 of the control server 7 receives the transmission discrimination format information 330B and the information specification format information 340B by the server network communicator 71 (step SF7). The server controller 70 transmits the received transmission discrimination format information 330B and the information specification format information 340B to the printer 3 indicated by the added serial number J14 (step SF8).

As shown in the flowchart FG, the sub-substrate controller 30B of the sub-substrate 3B of the printer 3 receives the transmission discrimination format information 330B and the information specification format information 340B by the printer network communicator 31B (step SG1).

Next, the sub-substrate controller 30B stores the received transmission discrimination format information 330B and the information specification format information 340B in the sub-substrate storage 310B (step SG2). In step SG2, when the transmission discrimination format information 330B and the information specification format information 340B are already stored in the sub-substrate storage 310B, the sub-substrate controller 30B updates the format information stored in the sub-substrate storage 310B to the received transmission discrimination format information 330B and the information specification format information 340B.

In this way, the sub-substrate controller 30B of the printer 3 receives the transmission discrimination format information 330B and the information specification format information 340B from the control server 7, and stores the received transmission discrimination format information 330B and the information specification format information 340B in the sub-substrate storage 310B. As a result, the printer 3 can execute processing relating to the transmission of the print text data ITD based on the transmission discrimination format and the information specification format which are set by the user of the management apparatus 5. Therefore, even when there are various changes such as a change of the POS terminal, a change of the print data ID, a change of the type of print text data ITD to be transmitted to the control server 7, and a change of information desired to be masked, the printer 3 can reliably prevent transmission of unnecessary print text data ITD, and can reliably transmit appropriate print text data ITD.

As described above, the printer 3 can communicate with the POS terminal 4 and the control server 7. The printer 3 includes a sub-substrate storage 310B storing the transmission discrimination format information 330B indicating the transmission discrimination format and information specification format information 340B indicating the information specification format, and the printing executor 3C that performs printing based on the print data ID received from the POS terminal 4. The printer 3 includes the sub-substrate controller 30B. The sub-substrate controller 30B discriminates whether or not the format of the print text data ITD based on the print data ID received from the POS terminal 4 is adapted to the transmission discrimination format indicated by the transmission discrimination format information 330B stored in the sub-substrate storage 310B. When it is discriminated that the format of the print text data ITD is adapted to the transmission discrimination format, the sub-substrate controller 30B converts or deletes, among the information included in the print text data ITD, information adapted to the information specification format indicated by the information specification format information 340B stored in the sub-substrate storage 310B, and transmits the print text data ITD to the control server 7.

The sub-substrate controller 30B can transmit only the print text data ITD adapted to the transmission discrimination format to the control server 7, and it is possible to prevent the print text data ITD relating to the printing of various printed matters from being unnecessarily transmitted to the control server 7. The sub-substrate controller 30B can transmit, to the control server 7, appropriate print text data ITD which does not include information adapted to the information specification format. Therefore, when transmitting the print text data ITD to the control server 7, the sub-substrate controller 30B can transmit appropriate print text data ITD along with preventing transmission of the print text data ITD unnecessarily.

The transmission discrimination format is a format of the print text data ITD relating to the printing of a specific type of a printed matter among the types of printed matters that can be printed by the printing executor 3C.

According to this configuration, the sub-substrate controller 30B can transmit only the print text data ITD relating to the printing of the specific type of a printed matter among the printed matters that can be printed by the printer 3 to the control server 7. Thereby, the sub-substrate controller 30B can prevent the print text data ITD from being transmitted to the control server 7 for all types of printed matters that can be printed by the printer 3. Therefore, the sub-substrate controller 30B can prevent the print text data ITD from being unnecessarily transmitted to the control server 7.

The transmission discrimination format is a format of the print text data ITD relating to the printing of a printed matter on which the settlement information about the settlement is printed.

According to this configuration, the sub-substrate controller 30B can prevent the print text data ITD relating to the printing of printed matter other than the receipt R from being transmitted to the control server 7. Therefore, the sub-substrate controller 30B can prevent the print text data ITD unnecessary for the text data analysis processing of the receipt R from being transmitted to the control server 7.

The information specification format is a format relating to a character string corresponding to personal information among the information included in the print text data ITD. The information specification format is a format relating to a layout of printing of personal information among the information included in the print text data ITD.

According to this configuration, the sub-substrate controller 30B can transmit the print text data ITD not containing personal information to the control server 7. Therefore, even when it is not desired to transmit personal information to the outside of the store system 2, the sub-substrate controller 30B can transmit appropriate print text data ITD to the control server 7.

The sub-substrate controller 30B analyzes the print text data, and based on the analysis result, discriminates whether the print text data format is adapted to the transmission discrimination format and the information specification format.

Text data is data in which information is described as text. Therefore, the sub-substrate controller 30B can discriminate whether the print text data format is adapted to the transmission discrimination format and the information specification format without performing data analysis other than analysis based on a character string. The sub-substrate controller 30B can prevent an increase in processing load in the discrimination and can easily discriminate the presence/absence of suitability of the format based on a character string.

The sub-substrate controller 30B receives the transmission discrimination format information 330B and the information specification format information 340B from the control server 7, and stores the received transmission discrimination format information 330B and the information specification format information 340B in the sub-substrate storage 310B.

According to this configuration, the printer 3 can execute processing relating to the transmission of the print text data ITD based on the transmission discrimination format and the information specification format which are set by the user of the management apparatus 5. Therefore, even when there are various changes such as a change of the POS terminal 4, a change of the print data ID, a change of the print text data ITD to be transmitted to the control server 7, a change of the information to be masked, the printer 3 can reliably prevent transmission of unnecessary print text data ITD, and can reliably transmit appropriate print text data ITD.

The present embodiment described above merely shows one aspect of the present disclosure, and any modification and application can be made within the scope of the present disclosure.

For example, the present embodiment described above exemplifies a case where the sub-substrate controller 30B executes processing relating to the print text data ITD such as generation of the print text data ITD, mask processing, and transmission. However, the main substrate controller 30A may execute the operations of the sub-substrate controller 30B. In a case of this configuration, the main substrate controller 30A corresponds to a controller. In a case of this configuration, the transmission discrimination format information 330B and the information specification format information 340B may be stored in the main substrate storage 310A. In a case of this configuration, the main substrate storage 310A corresponds to a storage. Further, in a case of this configuration, the main substrate controller 30A may control the printer communicator 32B and the printer network communicator 31B. The main substrate 3A and the sub-substrate 3B may be configured with one substrate.

Further, for example, the functions of the POS terminal controller 40, the main substrate controller 30A, the sub-substrate controller 30B, the manager controller 50, and the server controller 70 may be realized by a plurality of processors or a semiconductor chip.

In addition, for example, when a control method of the printer 3 indicated by the operations of the printer 3 described above is realized by using a computer included in the printer 3 or an external device connected to the printer 3, the present disclosure can also be configured in a form of a program executed by the computer to realize the control method, a recording medium in which the program is readably recorded by the computer, or a transmission medium for transmitting the program.

Further, for example, the processing units in FIG. 9 and FIG. 12 are divided according to the main processing contents in order to facilitate understanding of the processing of the POS terminal 4, the printer 3, the management apparatus 5, and the control server 7. The present disclosure is not limited by the method and name of division of the processing units. Regarding the processing contents, the processing contents may be divided into many processing units. One processing unit may be divided so as to include many processes. The order of the processing may be changed as appropriate within the scope of the present disclosure.

Each functional unit illustrated in FIG. 2 indicates a functional configuration, and a specific implementation form is not particularly limited. In other words, hardware corresponding to each functional unit does not necessarily have to be mounted, and it is possible to realize functions of a plurality of functional units by one processor executing a program. In the above-described embodiment, a part of the functions implemented by software may be implemented as hardware, or a part of the functions implemented by hardware may be implemented by software. In addition, specific detailed configurations of the POS terminal 4, the printer 3, the management apparatus 5, and other units of the control server 7 can be arbitrarily changed without departing from the scope of the present disclosure.

What is claimed is:

1. A printer configured to communicate with a terminal and an information processor, comprising:
a storage configured to store first format information indicating a first format and second format information indicating a second format;
a printing executor configured to perform printing based on printing information received from the terminal; and
a controller configured to
determine whether or not the printing information received from the terminal contains the first format information in the first format indicated by the first format information stored in the storage,
in response to determining that the printing information contains the first format information in the first format, determine whether or not the printing information contains the second format information in the second format after determining the first format information in the printing information;
in response to determining that the printing information contains the second format information in the second format,
convert or delete the second format information from the printing information; and
transmit, to the information processor, the printing information in which the second format information has been converted or deleted.

2. The printer according to claim 1, wherein the first format is a format of the printing information relating to the printing of a specific type of a printed matter among types of printed matters configured to be printed by the printing executor.

3. The printer according to claim 2, wherein the first format is the format of the printing information relating to the printing of the printed matter on which settlement information about a settlement is printed.

4. The printer according to claim 1, wherein the second format is a format relating to a character string corresponding to personal information among an information included in the printing information.

5. The printer according to claim 1, wherein the second format is a format relating to a layout of the printing of personal information among an information included in the printing information.

6. The printer according to claim 1, wherein
the controller is configured to analyze text data corresponding to the printing information, and based on an analysis result, to discriminate whether or not a format of the text data is adapted to the first format and the second format.

7. The printer according to claim 1, wherein the controller is configured to acquire the first format information and the second format information from the information processor, and to store the acquired first format information and the acquired second format information in the storage.

8. A control method of a printer configured to communicate with a terminal and an information processor, comprising:

storing, by a storage, first format information indicating a first format and second format information indicating a second format;

printing, by a printing executor, to perform printing based on printing information received from the terminal; and determining, by a controller, whether or not the printing information received from the terminal contains the first format information in the first format indicated by the stored first format information;

in response to the determining that the printing information contains the first format information in the first format, determining, by the controller, whether or not the printing information contains the second format information in the second format after determining the first format information in the printing information;

in response to the determining that the printing information contains the second format information in the second format, converting or deleting, by the controller, the second format information from the printing information; and, transmitting, to the information processor, the printing information in which the second format information has been converted or deleted.

9. The control method of the printer according to claim 8, wherein the first format is a format of the printing information relating to the printing of a specific type of a printed matter among types of printable printed matters.

10. The control method of the printer according to claim 9, wherein the first format is the format of the printing information relating to the printing of the printed matter on which settlement information about a settlement is printed.

11. The control method of the printer according to claim 8, wherein the second format is a format relating to a character string corresponding to personal information among an information included in the printing information.

12. The control method of the printer according to claim 8, wherein the second format is a format relating to a layout of the printing of personal information among the information included in the printing information.

13. The control method of the printer according to claim 8, further comprising: analyzing text data corresponding to the printing information, and based on an analysis result, determining whether or not a format of the text data is adapted to the first format and the second format.

14. The control method of the printer according to claim 8, further comprising: acquiring the first format information and the second format information from the information processor, and storing the acquired first format information and the acquired second format information in the storage.

* * * * *